US012687633B2

(12) United States Patent
Mori et al.

(10) Patent No.: US 12,687,633 B2
(45) Date of Patent: Jul. 21, 2026

(54) DETECTION SYSTEM, PROCESSING APPARATUS, MOVEMENT OBJECT, DETECTION METHOD, AND NON-TRANSITORY COMPUTER-READABLE STORAGE MEDIUM

(71) Applicant: Kabushiki Kaisha Toshiba, Tokyo (JP)

(72) Inventors: Akihiro Mori, Kawasaki (JP); Takuya Miyamoto, Kawasaki (JP); Daisuke Yamamoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1071 days.

(21) Appl. No.: 17/807,258

(22) Filed: Jun. 16, 2022

(65) Prior Publication Data

US 2022/0404495 A1 Dec. 22, 2022

(30) Foreign Application Priority Data

Jun. 18, 2021 (JP) ................................. 2021-101967

(51) Int. Cl.
*G01S 17/42* (2006.01)
*G01S 7/48* (2006.01)
(Continued)

(52) U.S. Cl.
CPC ............ *G01S 17/42* (2013.01); *G01S 7/4808* (2013.01); *G01S 7/4817* (2013.01)

(58) Field of Classification Search
USPC ................................................ 382/103, 104
See application file for complete search history.

(56) References Cited

U.S. PATENT DOCUMENTS

2005/0162418 A1 7/2005 Kase
2010/0017407 A1 1/2010 Beniyama et al.
(Continued)

FOREIGN PATENT DOCUMENTS

CN 1643526 A 7/2005
CN 108154483 A 6/2018
(Continued)

OTHER PUBLICATIONS

Combined Chinese Office Action and Search Report issued Sep. 18, 2025 in Chinese Patent Application No. 202210676801.4 (with unedited computer-generated English Translation), 14 pages.
(Continued)

*Primary Examiner* — Ishrat I Sherali
(74) *Attorney, Agent, or Firm* — Oblon, McClelland, Maier & Neustadt, L.L.P.

(57) ABSTRACT

A detection system includes an acquisition portion scanning light to acquire point-cloud information corresponding to a plurality of positions of a detection target object; an estimation portion using consistency with an outer shape model of the detection target object to estimate a location and attitude of the detection target object based on the point-cloud information; and an output portion outputting information relating to a movement target location based on an estimation result, wherein the estimation portion fits an outer shape model indicating an outer shape of the detection target object to a point cloud according to the point-cloud information, and uses point-cloud information existing outside the outer shape model to estimate the location and the attitude of the detection target object.

20 Claims, 14 Drawing Sheets

(51) Int. Cl.
  *G01S 7/481* (2006.01)
  *G01S 17/931* (2020.01)

(56) References Cited

U.S. PATENT DOCUMENTS

| | | | |
|---|---|---|---|
| 2015/0347840 A1 | 12/2015 | Iida et al. | |
| 2018/0158191 A1 | 6/2018 | Sasaki | |
| 2020/0150664 A1 | 5/2020 | Sonoura et al. | |
| 2020/0311965 A1 | 10/2020 | Mizukami | |
| 2021/0063577 A1 | 3/2021 | Liu et al. | |
| 2021/0312633 A1* | 10/2021 | Noh | G06V 10/443 |
| 2022/0128701 A1* | 4/2022 | Alghanem | G01S 17/894 |
| 2022/0180548 A1* | 6/2022 | Li | G06V 10/766 |
| 2022/0262132 A1* | 8/2022 | Takao | B66F 9/063 |
| 2022/0297992 A1* | 9/2022 | Sonoura | G05D 1/667 |
| 2023/0280466 A1* | 9/2023 | Noh | G06V 10/469 |

FOREIGN PATENT DOCUMENTS

| | | |
|---|---|---|
| CN | 111745639 A | 10/2020 |
| CN | 112099001 A | 12/2020 |
| CN | 112099002 A | 12/2020 |
| CN | 112198871 A | 1/2021 |
| CN | 112364865 A | 2/2021 |
| JP | 5259286 B2 | 8/2013 |
| JP | 2015-225450 A | 12/2015 |
| JP | 2019-98431 A | 6/2019 |
| JP | 2019-125345 A | 7/2019 |
| JP | 2019-196961 A | 11/2019 |
| JP | 2020-38498 A | 3/2020 |
| JP | 2020-64563 A | 4/2020 |
| JP | 2020-77295 A | 5/2020 |
| JP | 2020-155131 A | 9/2020 |
| JP | 2020-175979 A | 10/2020 |
| JP | 2020-175997 A | 10/2020 |
| JP | 2020-190814 A | 11/2020 |

OTHER PUBLICATIONS

Ming et al., "RANSAC LiDAR Building Extraction Method with Constraints", Remote Sensing Information, vol. 33, No. 3, Jun. 2018, 17 pages (with unedited computer-generated English Translation).

Japanese Office Action issued Sep. 3, 2024 in Japanese Application 2021-101967, (with unedited computer-generated English translation), 8 pages.

Combined Chinese Office Action and Search Report issued Dec. 31, 2024 in Chinese Patent Application No. 202210676801.4, (with unedited computer-generated English translation), 17 pages.

Skotheim et al., "A Flexible 3D Object Localization System for Industrial Part Handling", 2012 IEEE/RSJ International Conference on Intelligent Robots and Systems, Oct. 7-12, 2012, Vilamoura, Algarve, Portugal, pp. 3326-3333, XP032312382.

Combined Chinese Office Action and Search Report issued Mar. 2, 2026 in Chinese Patent Application No. 202210676801.4, (with English translation), 8 pages.

* cited by examiner

FIG. 5
| Case | Zone |
|------|------|
| 1 | ($\Delta X, +Y0), (+X0, +Y0), (+X0, -Y0), (\Delta X, -Y0)$ |
| 2 | ($\Delta X, +Y1), (+X1, +Y1), (+X1, -Y1), (\Delta X, -Y1)$ |
~401
FIG. 6A
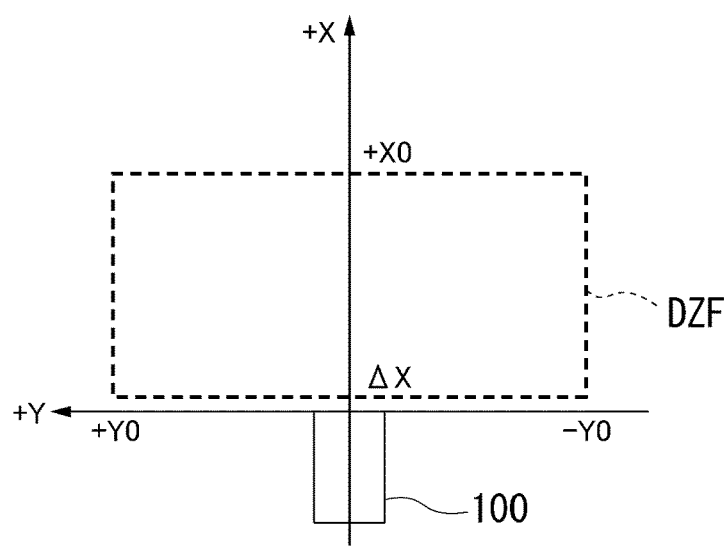
FIG. 6B
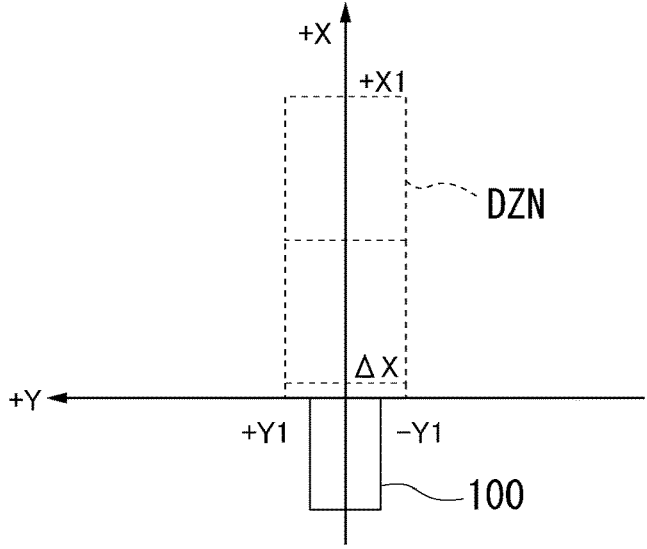

403

| No | LOCATION | ATTITUDE | TYPE OF TROLLEY |
|----|----------|----------|-----------------|
| ⋮ | ⋮ | ⋮ | ⋮ |
| k−2 | ZZ | +7 | 90Z |
| k−1 | ZA | +5 | 90A |
| k | ZB | − | なし |
| k+1 | ZC | − | なし |
| ⋮ | ⋮ | ⋮ | ⋮ |

Figure 16:
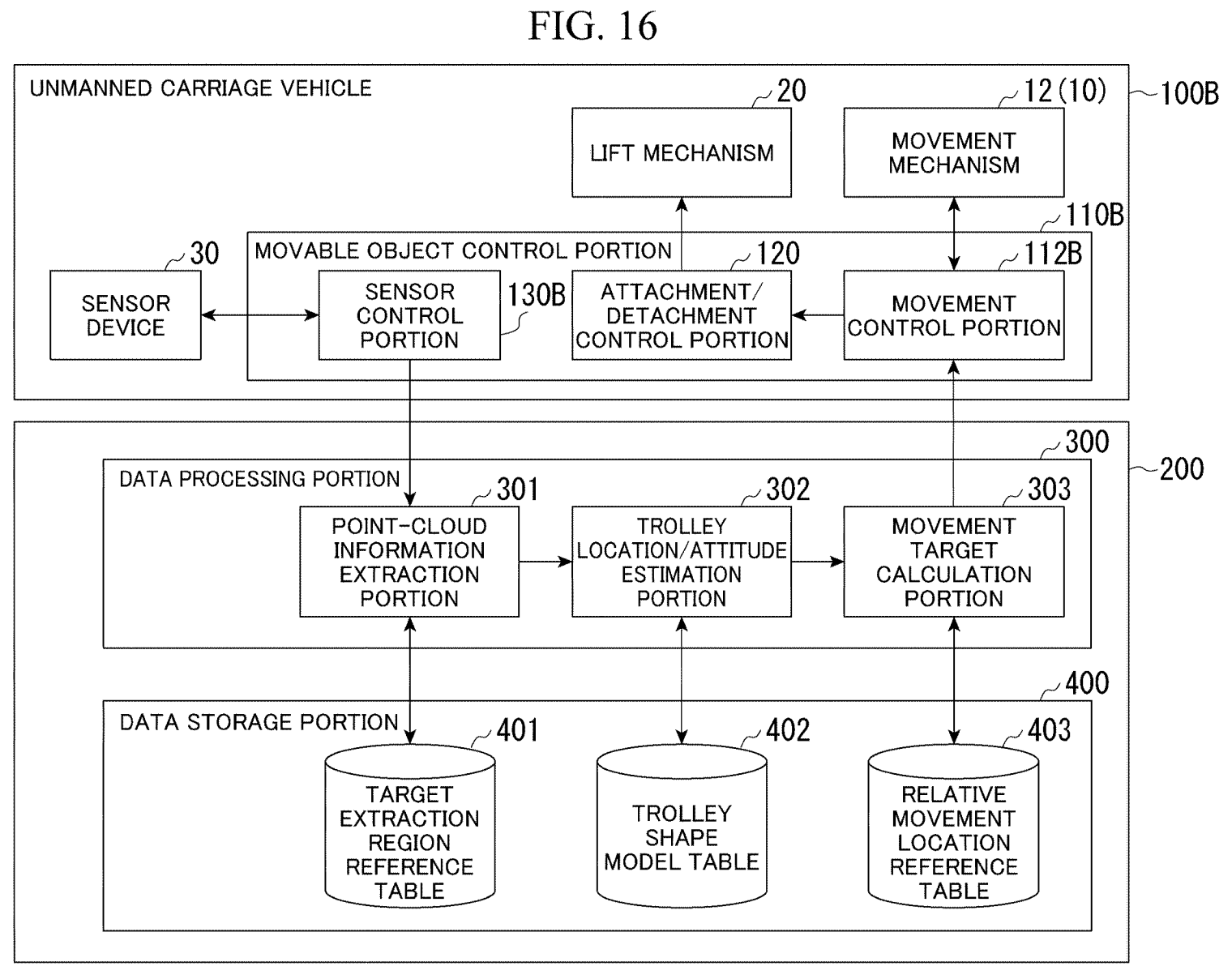

UNMANNED CARRIAGE VEHICLE — 100B

MOVEMENT MECHANISM — 12 (10)

LIFT MECHANISM — 20

SENSOR DEVICE — 30

MOVABLE OBJECT CONTROL PORTION — 110B

MOVEMENT CONTROL PORTION — 112B

ATTACHMENT/ DETACHMENT CONTROL PORTION — 120

SENSOR CONTROL PORTION — 130B

DATA PROCESSING PORTION — 200

MOVEMENT TARGET CALCULATION PORTION — 303

TROLLEY LOCATION/ATTITUDE ESTIMATION PORTION — 302

POINT-CLOUD INFORMATION EXTRACTION PORTION — 301

— 300

DATA STORAGE PORTION — 400

RELATIVE MOVEMENT LOCATION REFERENCE TABLE — 403

TROLLEY SHAPE MODEL TABLE — 402

TARGET EXTRACTION REGION REFERENCE TABLE — 401

DETECTION SYSTEM, PROCESSING APPARATUS, MOVEMENT OBJECT, DETECTION METHOD, AND NON-TRANSITORY COMPUTER-READABLE STORAGE MEDIUM

This application is based upon and claims the benefit of priority from Japanese Patent Application No. 2021-101967, filed on Jun. 18, 2021; the entire contents of which are incorporated herein by reference.

FIELD

Embodiments described herein relate to a detection system, a processing apparatus, a moveable object, a detection method, and a non-transitory computer-readable storage medium.

BACKGROUND

In a logistic and distribution field, there is a case of transporting a transportation target object such as a cage truck carrying a load. When an unmanned carriage vehicle detects the transportation target object, there is a request to transport the transportation target object, deploy other transportation target object in close to the transportation target object, and the like. However, there is a case that it is not easy to recognize a location and an attitude of the deployed transportation target object.

BRIEF DESCRIPTION OF DRAWINGS

FIG. 5 is a view for describing an extraction target region reference table defining an extraction target region according to the first embodiment.

FIG. 6A is a view for describing the extraction target region according to the first embodiment.

FIG. 6B is a view for describing the extraction target region according to the first embodiment.

FIG. 14 is a view for describing an extraction target region according to the third embodiment.

FIG. 16 is a view showing a configuration of the detection system according to the fourth embodiment.

DETAILED DESCRIPTION

Figure 1A:
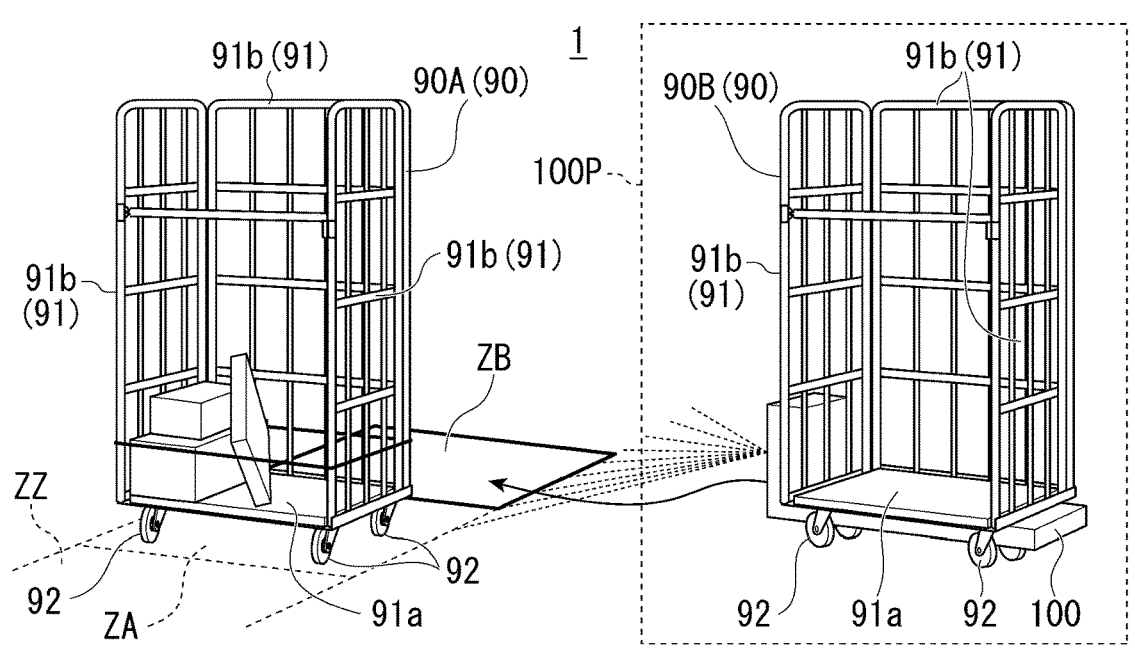
FIG. 1A is a schematic view showing an example of an applicable location of a detection system according to a first embodiment.

Hereinafter, a detection system, a processing apparatus, a movement object, a detection method, and a program according to embodiment will be described by referring to figures. In the description below, configurations having the same or similar function will be assigned with the same reference sign. The redundant descriptions of these configurations may be omitted. In the present disclosure, the recitation "according to XX" means "at least according to XX", and the case according to other element in addition to XX is included. The recitation "according to XX" is not limited to the case of directly using XX, and the case according to the results of performing calculation or processing with respect to XX is included. The recitation XX refers to an arbitrary element (for example, arbitrary information).

Furthermore, a direction +X, a direction −X, a direction +Y, a direction −Y, a direction +Z, and a direction −Z will be defined in advance. The direction +X, the direction −X, the direction +Y, and the direction −Y are directions for an unmanned carriage vehicle to move along a floor surface. The direction +X, for example, is a movement direction of an unmanned carriage vehicle 100, and there is a case in which the direction +X is referred to as a "front direction". The direction −X, for example, is an opposite direction of the direction +X, and there is a case in which the direction −X is referred to as a "rear direction". In a case in which the direction +X and the direction −X are not distinguished from each other, the direction +X and the direction −X may be simply referred to as the direction X. The direction +Y and the direction −Y are directions intersecting with the direction X (for example, substantially orthogonal to the direction X), and there is a case in which the direction +Y and the direction −Y are referred to as a vehicle width direction of the vehicle body 10 or a "lateral direction". In a case in which the direction +Y and the direction −Y are not distinguished from each other, the direction +Y and the direction −Y may be simply referred to as the direction Y. The direction +Z and the direction −Z are directions intersecting with the direction X and the direction Y (for example, substantially orthogonal to the direction X and the direction Y), and for example, the direction +Z and the direction −Z are the vertical direction. The direction +Z is a direction forwarding to the upward direction. The direction −Z is the opposite direction of the direction +Z. In a case in which the direction +Z and the direction −Z are not distinguished from each other, the direction +Z and the direction −Z may be simply referred to as the direction Z. The recitations such as "the front direction", "the rear direction", "the lateral direction", and "the vehicle width direction" in the present specification are expressions made from the view point based on one movement direction of the unmanned carriage vehicle 100 for simplifying the description. However, the movement direction of the unmanned carriage vehicle 100 is not limited to the direction +X. The unmanned carriage vehicle 100 may be movable in the direction –X, the direction +Y, and the direction –Y.

First Embodiment

Figure 1B:
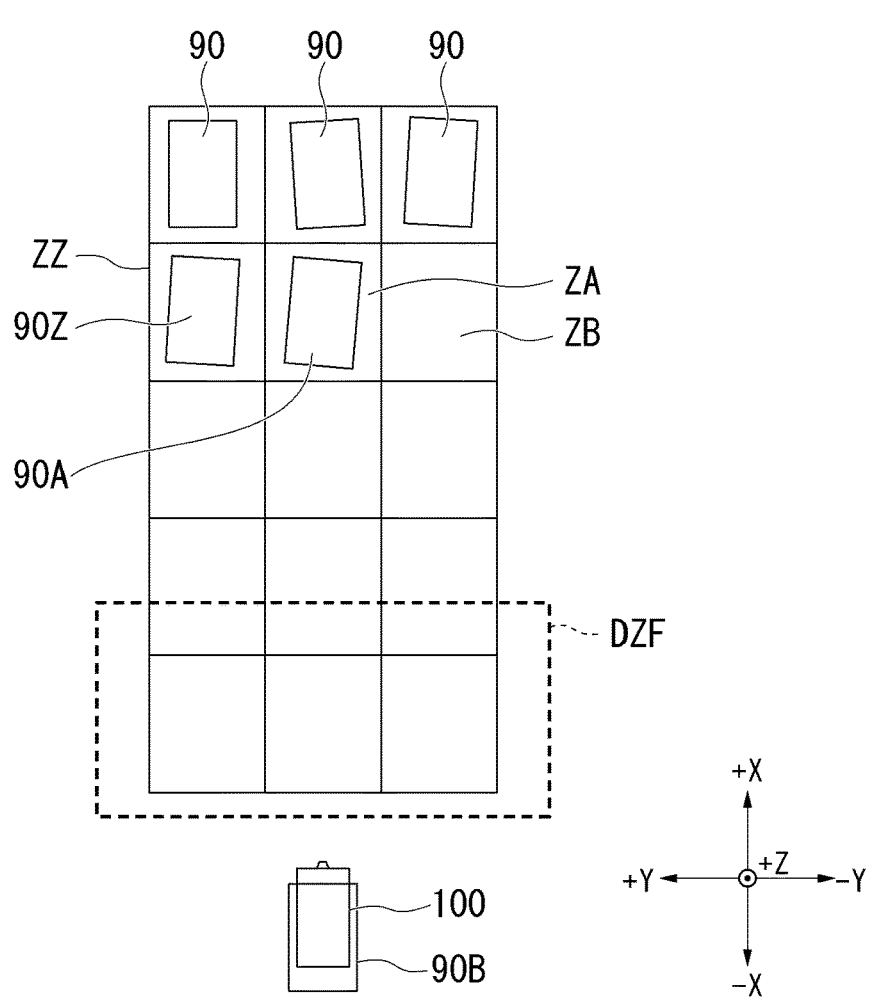
FIG. 1B is a planar view showing the applicable location shown in FIG. 1A.
Figure 2:
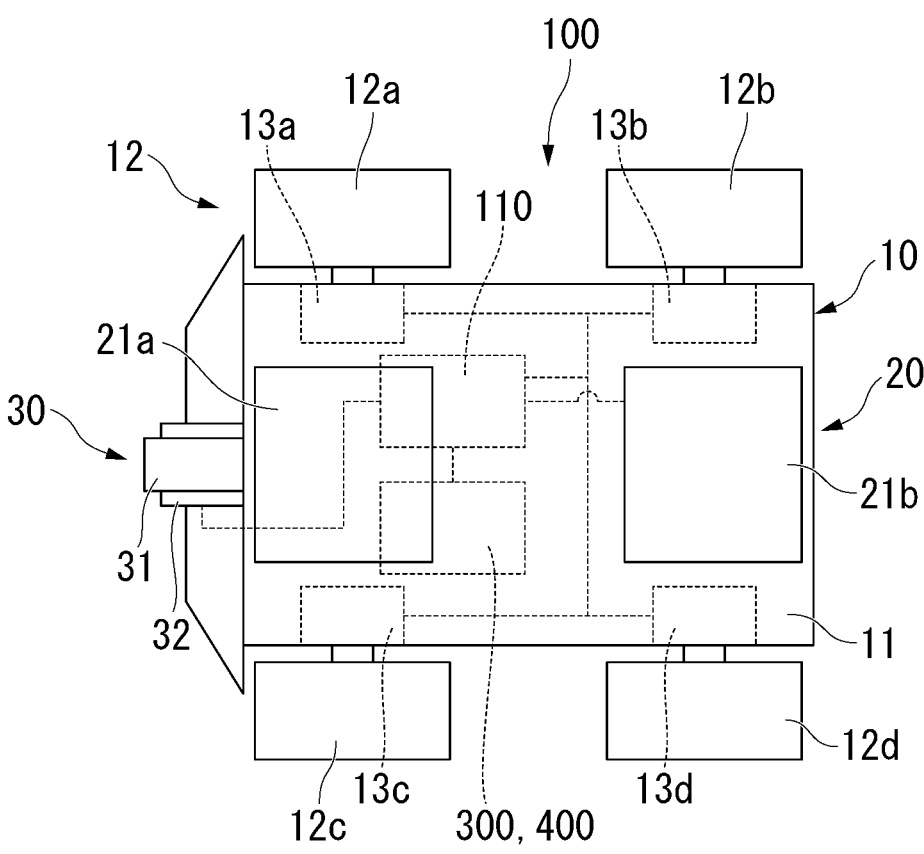
FIG. 2 is a planar view showing an unmanned carriage vehicle according to the first embodiment.
Figure 3:
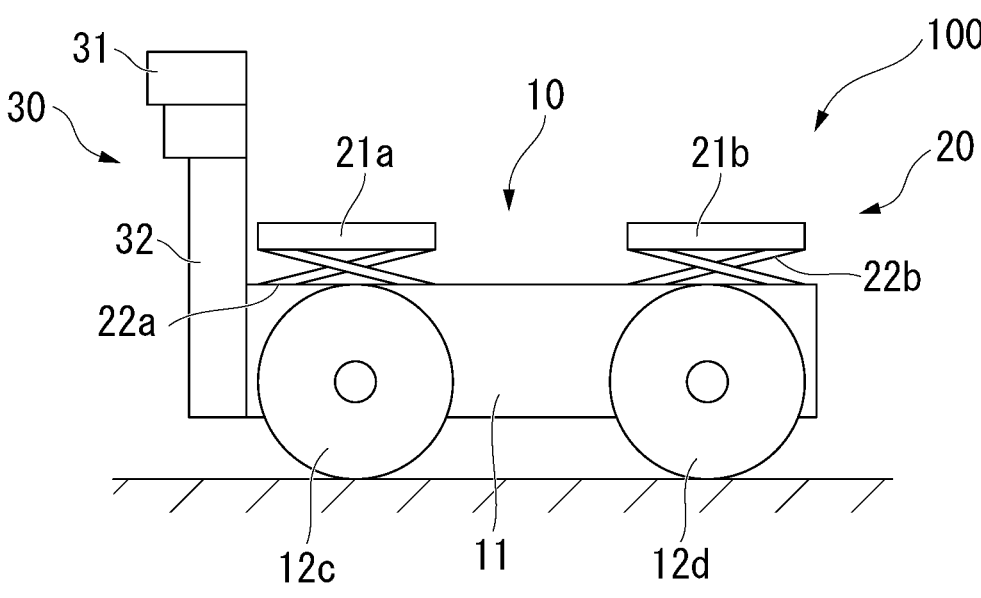
FIG. 3 is a side-view showing the unmanned carriage vehicle according to the first embodiment.

FIG. 1A is a schematic view showing an example of an applicable location of a detection system 1 according to a first embodiment. FIG. 1B is a planar view showing the applicable location in FIG. 1A. FIG. 2 is a planar view showing the unmanned carriage vehicle according to the first embodiment. FIG. 3 is a lateral view showing the unmanned carriage vehicle according to the first embodiment.

The detection system 1 according to the embodiments includes a part of or all of the unmanned carriage vehicle 100. The unmanned carriage vehicle 100 may be an example of the detection system 1. The detection system 1 may formed as part of the unmanned carriage vehicle 100. In FIG. 1A and FIG. 1B, the unmanned carriage vehicle 100 and the trolleys 90A, 90B as the transportation target objects according to the detection system 1 are shown therein.

The trolleys 90A, 90B are the transportation target objects of the unmanned carriage vehicle 100, for example, the trolleys 90A, 90B are cage trucks such as the roll box pallets. The trolley 90A is deployed in a region ZA in a state of loading the luggage. A region ZB being adjacent to the region ZA is in a state in which there is no carriage deployed. The trolley 90B is an object to be deployed in the region ZB. In the state shown in FIG. 1A, a step on the way in which the trolley 90B is being transported to the region ZB by the unmanned carriage vehicle 100. In the following description, when the trolleys 90A, 90B are described without being distinguished from each other, there are cases in which they are simply referred to as the trolley 90.

For example, the location shown in FIG. 1A and FIG. 1B is an example of an unloading location in a distribution warehouse. In such a location, the luggage (load) collected by the trolley 90, loaded and transported by the trolley 90 is picked up based on a predetermined sequence. Accordingly, in the trolley 90 that is firstly deployed, the luggage is in the state of being stacked and the carry-out of the luggage from the trolley 90 and waiting for the carry-out.

The trolley 90 according to the present embodiment is an example of the transportation target (detection target object). The trolley 90 may be configured to be detected by scanning using the light. For example, in a case in which the trolley 90 includes a cage, the trolley 90 may be a movement object having an outer shell with only part of the internal space being visible, or the trolley 90 may be a movement object having an outer shell covering all of the internal space such that nothing is visible from the outside. In either of the above-described case, it is possible to extract the point cloud based on the location of the outer shell that is detected by the scanning and use the point-cloud information to perform fitting such that the shape thereof is recognizable. In this manner, it is possible to be applied to all of the configurations that the shape of the trolley 90 is recognizable. Even in a case in which the trolley 90 is a flat-plate (pallet) carriage without the cage, only if the packaging style at the time of loading and transporting the luggage can be (approximately) stylized, it is possible to extract the point cloud based on the location of the packaging style that is detected by the scanning and use the point-cloud information to perform fitting such that the shape thereof is recognizable. In this manner, even the trolley 90 does not include the cage, it is possible to be applied to all of the configurations that the shape of the packaging style is recognizable. This case is an example being considerable to be the same as the trolley 90 including the outer shell that is invisible from the outside.

In the following descriptions, the example in which the outer shell is relatively difficult to be detected among the above-described examples will be described. The trolley 90 is configured such that lateral surface as the outer shell thereof includes a pipe frame and a resin mesh. The trolley 90 is configured that the internal space thereof is visible from the outside of the lateral surface. There is a case in which the presence or absence, the load amount, and the packaging style of the luggage is not uniquely determined.

In a case in which a plurality of trolleys 90 are collected and deployed in such a pick-up location, it is possible to increase the space utilization efficiency of the pick-up location by arranging the trolleys 90 relatively densely. According to the present embodiment, the example of automating the transportation operations of the trolleys 90 while fulfilling such demands by introducing the unmanned carriage vehicle 100 as the example of the mobile robot will be described.

In order to respond to such demands, it is necessary to detect the location and attitude of the deployed trolley 90A, set a movement target of the unmanned carriage vehicle 100 and move the unmanned carriage vehicle 100 using the suitable movement path to the movement target so as to arrange and deploy the trolley 90B to the locations adjacent to the trolley 90A.

For example, the unmanned carriage vehicle 100 is an autonomous mobile trolley that does not require operations by an operator so as to be movable alone. The unmanned carriage vehicle 100 is, for example, a low-floor type AGV (Automatic Guided Vehicle). However, the unmanned carriage vehicle 100 may be a lineless type that does not require the lines drawn on the floor. The reference sign DZF in FIG. 1B shows an example of the region for the unmanned carriage vehicle 100 to detect the target objects such as the trolley 90 and the obstacles. This will be described later.

The unmanned carriage vehicle 100 sneaks into the lower side of the trolley 90B and couples to the trolley 90B. The case of the trolley 90A is the same with that of the trolley 90B. The unmanned carriage vehicle 100 and the trolley 90 coupled with the unmanned carriage vehicle 100 configure a coupled body 100P. The unmanned carriage vehicle 100 is not limited to the above-described example and may be a different type of the unmanned carriage vehicle. For example, the unmanned carriage vehicle 100 may be further formed to be operable by the operator.

For example, the unmanned carriage vehicle 100 in the state of being coupled to each trolley 90 transports the trolley 90A loading the luggage and the trolley 90B that does not load the luggage one by one in the workplace.

The trolley 90, for example, includes a loading portion 91 and a caster (wheel) 92. The loading portion is a portion for loading the luggage. The loading portion 91 includes a loading plate 91a and a protection fence 91b. The loading plate 91a, for example, is a plate material with a planar shape. The luggage is loaded on the loading plate 91a. The protection fence 91b, for example, is provided on the three sides of the outer edge of the loading plate 91a to be standing therefrom, and the protection fence 91b is open on one side lateral surface (the surface facing the direction +Y).

For example, the protection fences 91b provided to stand along the three sides of the outer edge of the trolley 90 are formed by a pipe frame including members disposed in a grid pattern. The configuration of the loading plate 91a is not particularly limited, and the protection fence 91b may be formed by a pipe frame disposed to be parallel to the vertical direction. Furthermore, the resin mesh may be disposed on part of the protection fence 91*b*. The resin mesh separated from the protection fence 91*b* may be configured to cover the luggage. In the case described above, the dimension of the grid formed in the pipe frame, the spacing of the pipe frame, and the hole size of the resin mesh are determined based on the shape and the dimension of the luggage loaded on the trolley 90 so as to prevent the luggage from falling. The above-described pipe frame is an example of the member for making the light to reflect or scatter.

The casters 92 are disposed on the four corners of the back surface of the loading plate 91*a*, respectively. The casters 92 are configured to support the loading portion 91 from the lower side. The casters 92 are the travelling portion. Each of the casters 92 is rotatable around the direction Z and able to change the travelling direction. The transportation target object is not limited to the trolley 90 according to the embodiment shown in the figures. For example, two of the four casters 92 may be two-axis fixed type that does not rotate around the direction Z. It is possible to perform the transportation even the limitations of the movement due to the two 2-axis fixed type casters 92 occur. The loading portion 91 is an example of the detection target object.

The unmanned carriage vehicle 100 shown in FIG. 2, for example, includes a vehicle main body 10, a lift mechanism 20, a sensor device 30, a movement-object-control portion 110, a data processing portion 300, and a data storage portion 400. The vehicle main body 10 includes a vehicle body case 11 as the vehicle body and a movement mechanism 12. A width of the vehicle main body 10 is a width suitable to sneak into the lower side of the loading portion 91 of the trolley 90. The vehicle body case 11 forms the outer shell of the vehicle main body 10. The movement mechanism 12 is a travelling mechanism including the four wheels 12*a*-12*d* disposed at the four corners of the vehicle main body 10 and motors 13*a*-13*d* for driving the wheels 12*a*-12*d* respectively. The motors 13*a*-13*d* are connected to the wheels 12*a*-13*d* via axles respectively.

The wheels 12*a*-12*d* of the movement mechanism 12, for example, are formed from mecanum wheels. The mechanism 12 is configured to move the vehicle body case 11. The movement mechanism 12, for example, is an omnidirectional movement mechanism configured to move in all directions by rotationally driving each wheels 12*a*-12*d* individually by the motors 13*a*-13*d*. The movement mechanism 12 is formed to move the unmanned carriage vehicle 100 in the real space. The unmanned carriage vehicle 100 is movable in all directions by adjusting the rotation direction and rotation speed of each wheel in the movement mechanism 12.

The movement mechanism 12 may be the omnidirectional movement mechanism having the wheels other than the mecanum wheels. Otherwise, the movement mechanism 12 may be formed as the movement mechanism by a differential two-wheel system. The movement mechanism 12 may include a steering mechanism so as to control the steering of part of the wheels or all of the wheels further to the rotation speed and the rotation direction of the wheels. Encoders are attached to the axles connected to the wheels 12*a*-12*d* and the motors 13*a*-13*d* respectively such that the number of rotations of each wheel 12*a*-12*d* is continuously measurable.

As shown in FIG. 3, the lift mechanism 20 includes two lifting boards 21*a*, 21*b* and elevating mechanism 22*a*, 22*b*. The elevating mechanism 22*a*, 22*b* includes link mechanism and actuators configured to lift and lower the lifting boards 21*a*, 21*b* respectively. The lifting boards 21*a*, 21*b* are able to be lifted and lowered by stretching and shortening the link mechanism in the elevating mechanism 22*a*, 22*b*. For example, the lifting boards 21*a*, 21*b* are configured to support the bottom surface of the trolley 90 in the state of being moved toward the upper side (direction+Z) and the relative positional relationship with respect to the trolley 90 of the unmanned carriage vehicle 100 is fixed. Accordingly, the unmanned carriage vehicle 100 and the trolley 90 are coupled with each other to form the coupled body 100P (see FIG. 1A). The lift mechanism 20 lowers the lifting boards 21*a*, 21*b* from the load-receiving height position such that the lifting boards 21*a*, 21*b* are released from the state of supporting the loading portion 91 and the coupling of the unmanned carriage vehicle 100 and the trolley 90 in the coupled body 100P is released.

The recitation "coupling" in the present application means a broad concept such as "physically associating two objects", and the recitation refers to supporting the trolley 90 (for example, lifting from the lower side), for example, coupling with the trolley 90 (for example, hooking on the trolley 90), and engaging with the trolley 90 (for example, directly or indirectly connecting with the trolley 90). For example, an engagement portion protruding toward the trolley 90 to engage with the trolley 90, and a connection portion connecting with the trolley 90 may be provided. The unmanned carriage vehicle 100 only has to be able to transport the transportation target object by coupling with the trolley 90 by either of the above-described methods.

As shown in FIG. 3, the sensor device 30 includes a sensor 31 and a support portion 32. The support portion 32 is configured to support the sensor 31 provided on the vehicle main body 10. The sensor 31 is, for example, a three-dimensional distance sensor such as a laser range finder (LRF) or the like configured to be able to irradiate the laser toward the trolley 90. The sensor 31 irradiates the laser along a virtual plane and generates the scanning results in this virtual plane as point-cloud information. The virtual plane, for example, is a plane when the laser scan beam is swayed horizontally with respect to the ground. Other examples of the virtual plane will be described later.

During the process when the unmanned carriage vehicle 100 approaches the trolley 90, the sensor 31 generates detection distance information that is the information relating to the distance from the trolley 90 in the front direction (direction +X). The detection distance information is the measurement results of the reflected light or the scattered light of the laser when the laser is irradiated to the trolley 90 or the like; however, the detection distance information is not limited thereto. The sensor 31 outputs the generated detection distance information to the movement-object-control portion 110. The unmanned carriage vehicle 100 includes various of sensors for performing the SLAM (Simultaneous Localization and Mapping) that is not shown in figures and various of sensors such as the Encoder odometry and the like.

Figure 4:
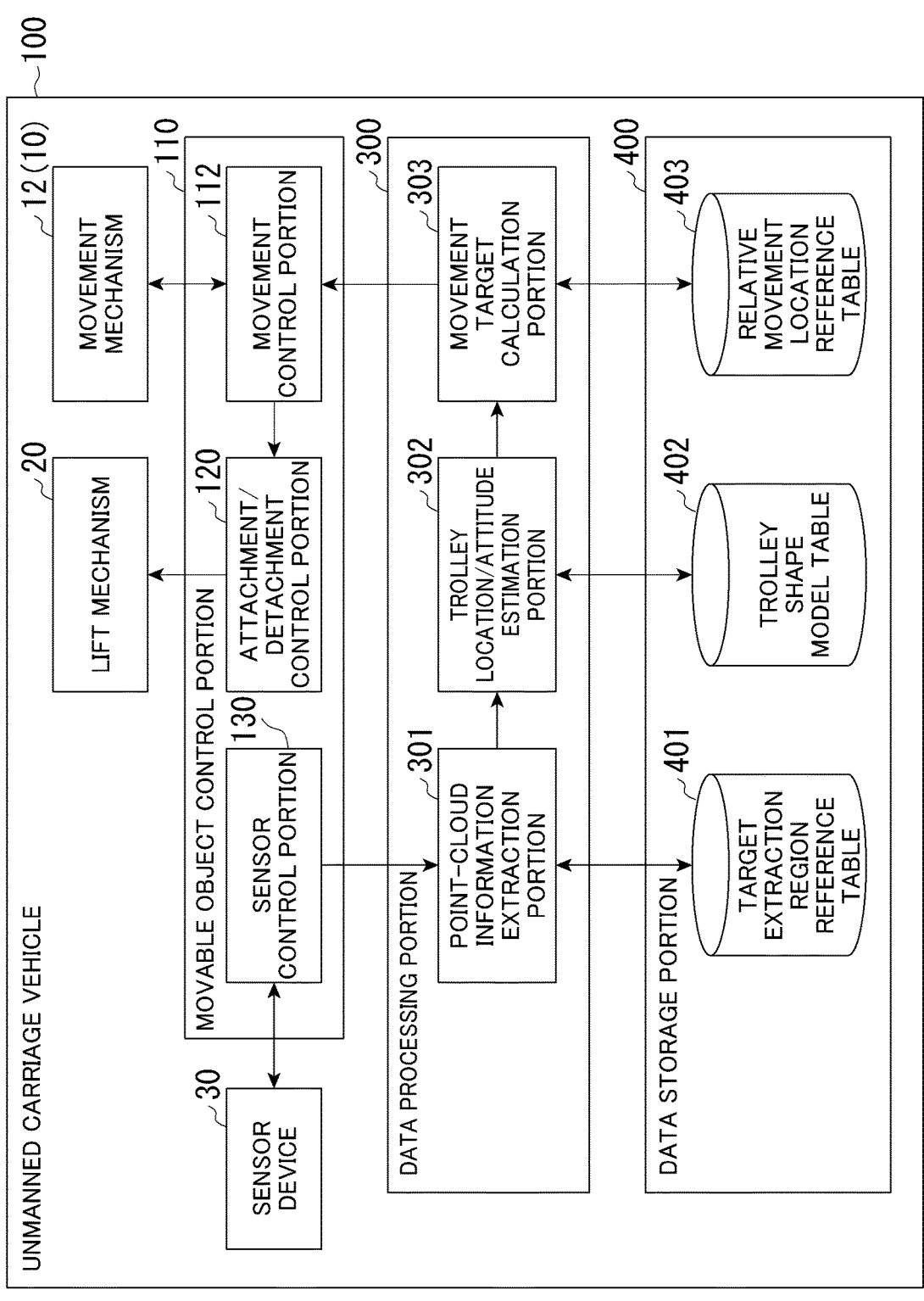
FIG. 4 is a view showing a configuration of the unmanned carriage vehicle according to the first embodiment.

FIG. 4 is a configuration view of the unmanned carriage vehicle 100 according to the first embodiment. As shown in FIG. 4, the unmanned carriage vehicle 100 includes the movement-object-control portion 110, the data processing portion 300, and the data storage portion 400. Each functional portion of the unmanned carriage vehicle 100 (for example, the movement-object-control portion 110 and the data processing portion 300) is, for example, at least a part thereof is realized by the hardware processor such as the CPU (Central Processing Unit), the GPU (Graphics Processing Unit) or the like to execute the program (software) stored in the storage portion. A part or all of the functional portions of the unmanned carriage vehicle 100 may be realized by the hardware (circuit portion; circuitry) such as the LSI (Large Scale Integration), the ASIC (Application Specific Integrated Circuit), the FPGA (Field-Programmable Gate Array) or the like, and may be realized by the cooperation of the software and the hardware. The unmanned carriage vehicle 100 is an example of the computer.

The movement-object-control portion 110, for example, includes a movement control portion 112, an attachment-detachment control portion 120, and a sensor control portion 130.

The movement control portion 112 is configured to acquire control information including the movement target and the like from the data processing portion 300 and drive the movement mechanism 12 to a location indicated by the movement target. Accordingly, the movement control portion 112 is able to move the unmanned carriage vehicle 100. For example, the movement control portion 112 acquires the location of the unmanned carriage vehicle 100 and supplies location arrival information indicating that the unmanned carriage vehicle 100 arrives the predetermined location to the attachment-detachment control portion 120. For example, the movement control portion 112 may control the movement mechanism 12 to make the unmanned carriage vehicle 100 to move in the real space according to the information relating to the location and attitude of the detection target object. The movement mechanism 12 and the movement control portion 112 are one example of a movable mechanism configured to move the location of the sensor 31 (the distance sensor).

The attachment-detachment control portion 120 receives the location arrival information from the movement control portion 112 to control the lift mechanism. Accordingly, the attachment-detachment control portion 120 switches the coupling state of the unmanned carriage vehicle 100 and the trolley 90 to control the attachment and detachment of the trolley 90.

The sensor control portion 130 is configured to acquire the detection distance information generated by the sensor 31 and output the detection distance information to the data processing portion 300.

The data processing portion 300 includes a point-cloud information extraction portion 301, a trolley location-attitude estimation portion 302, and a movement target calculation portion 303.

The point-cloud information extraction portion 301 acquires the detection distance information indicating the distance to the trolley 90 from the sensor control portion 130, and extracts the point-cloud information indicating the detection point in the predetermined range from the acquired detection distance information. The detection distance information is an index of the distances to a plurality of points corresponding to a plurality of locations of the detection target object by scanning the light. For example, the plurality of locations of the detection target object by scanning the light may be the locations of reflecting the light, scanning the virtual plane, in the real space scanning. The point-cloud information extraction portion 301 refers to an extraction target region reference table 401 to acquire the information indicating the extraction target region. The point-cloud information extraction portion 301 may extract the point-cloud information indicating the detection points in the predetermined region based on the information indicating the extraction target region that is acquired from the extraction target region reference table 401. The above-described detection distance information is an example of the point-cloud information. The point-cloud information extraction portion 301 supplies the extracted point-cloud information to the trolley location-attitude estimation portion 302. The point-cloud information extraction portion 301 is an example of the acquisition portion.

The trolley location-attitude estimation portion 302 estimates the location-attitude of the detection target object based on the extracted point-cloud information extracted by the point-cloud information extraction portion 301. The trolley location-attitude estimation portion 302, for example, may estimate the location-attitude of the detection target object according to a predetermined estimation rule using a consistency with the outer shape model relating to the detection target object as an evaluation index. The trolley location-attitude estimation portion 302 is an example of the estimation portion. For example, the trolley location-attitude estimation portion 302 estimates the location-attitude of the outer shape model by fitting the outer shape model indicating the shape of the detection target object to the point cloud of the point-cloud information. The trolley location-attitude estimation portion 302 may estimate the location-attitude of the detection target object using the point-cloud information at the outside of the outer shape model.

The movement target calculation portion 303 determines the movement target location based on the estimation result of the location-attitude of the detection target object and outputs the information relating to the movement target location. The movement target calculation portion 303 is an example of the output portion.

The data storage portion 400 includes the extraction target region reference table 401, a trolley outer shape model data 402, and a relative movement location reference table 403.

The extraction target region reference table 401 holds the data according to the extraction target region indicating the target region of the extraction processing and prompts to the point-cloud information extraction portion 301. The trolley outer shape model data 402 holds the data according to the outer shape model of the trolley 90 as the detection target object as the trolley outer shape model data. For example, the shape of the trolley 90 in the planar view is determined as the outer shape model. The shape of the loading plate 91a of the trolley 90 may be determined as the outer shape model. The relative movement location reference table 403 holds the relative movement location information for prompting the target movement destination for deploying the next trolley 90 and the like to the movement target calculation portion 303. It is possible to align with the deployed trolley 90 by arranging the trolley 90 according to the relative movement location information.

Next, the setting processing of the extraction target region according to the embodiment will be described referring to FIG. 5 and FIG. 6B.

FIG. 5 is a view for describing the extraction target region reference table 401 for defining the extraction target region according to the embodiment. FIG. 6A and FIG. 6B are views for describing the extraction target region according to the embodiment.

One or more than one extraction target region is defined using this extraction target region reference table 401. For example, two extraction target regions are defined in the extraction target region reference table 401 shown in FIG. 5. The extraction target region reference table 401 includes items of an applicable case (disclosed as "case" in FIG. 5) and an extraction target region (disclosed as "zone" in FIG. 5) corresponding to the applicable case. The extraction target region is defined in a coordinate system based on the unmanned carriage vehicle 100.

A first applicable case defined here is applied in a case in which the distance from the unmanned carriage vehicle 100 to the trolley 90 is relatively far as shown in FIG. 1A. As shown in FIG. 6A, the extraction target region DZF is defined as a rectangle with four points of (+ΔX, +Y0), (+X0, +Y0), (+X0, −Y0), and (+ΔX, −Y0) as the vertices. In the above-described case, a range having a width of 2Y0 in the direction Y with the travelling direction (direction +X) as a reference direction. The values of +Y0 and −Y0 are defined so as to include a region in which a plurality of trolleys 90 can be deployed in the direction Y in the range. The magnitude (absolute value) of +Y0 and −Y0 may be the same with each other, or be different from each other. With regard to the direction +X, a range until +X0 is specified as the extraction target region DZF. The value of +X0 may be decided arbitrarily. For example, the value of X0 may be defined so as to include a region in which a plurality of trolleys 90 can be arranged in the direction X in the range. The value of +ΔX may be defined based on the measurement limit or the like.

On the other hand, the second applicable case is applied in a case in which the distance from the distance from the unmanned carriage vehicle 100 to the trolley 90 is relatively short. As shown in FIG. 6B, the extraction target region DZN is defined as a rectangle with four points of (+ΔX, +Y1), (+X1, +Y1), (+X1, −Y1), and (+ΔX, −Y1) as the vertices. In the above-described case, a range having a width of 2Y1 in the direction Y with the travelling direction (direction +X) as a reference direction. The values of +Y1 and −Y1 are defined so as to include a region in which a plurality of trolleys 90 can be deployed in the direction Y in the range. The magnitude (absolute value) of +Y1 and −Y1 may be the same with each other, or be different from each other. With regard to the direction +X, a range until +X1 is specified as the extraction target region DZN. The value of +X1 is decided so as to include a region in which up to two trolleys 90 can be deployed in the direction X. For example, by setting so as to include the area in which up to two trolleys 90 can be deployed, it is possible to sequentially detect changes in the situation when approaching the trolleys 90 deployed in the region.

The extraction target regions DZF, DZN are one example of the extraction target region of the trolley 90 that is detected as the detection target object. These extraction target regions DZF, DZN are designated as relative locations with respect to the unmanned carriage vehicle 100.

Next, the extraction processing of the point cloud according to the embodiment will be described by referring to FIG. 7A and FIG. 7B.

Figure 7A:
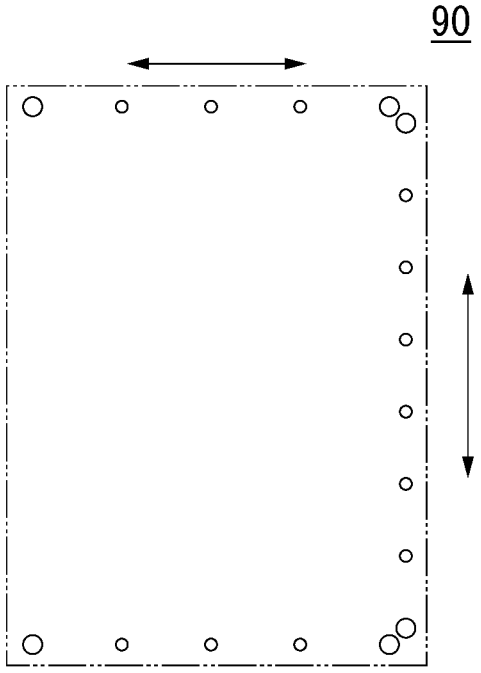
FIG. 7A is a view for describing an extraction processing of a point cloud according to the first embodiment.
Figure 7B:
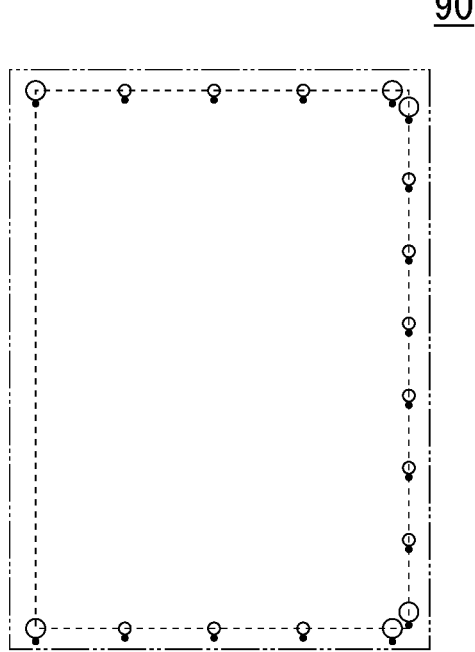
FIG. 7B is a view for describing the extraction processing of the point cloud according to the first embodiment.

FIG. 7A and FIG. 7B are views for describing the extraction processing of the point cloud according to the embodiment. In FIG. 7A, a cross-sectional view of the trolley 90 in a virtual plane at the height where the laser is irradiated from the sensor 31 and scanned. In FIG. 7B, a planar view showing by modeling a distribution of the point cloud obtained as a result of the scanning is shown. As described above, the protection fence 91b including the member for reflecting the light is provided on the lateral surface of the trolley 90. The two-dot chain line in the cross-sectional view shown in FIG. 7A shows the outer shape of the trolley 90, and the circles scattered inside the rectangle show the cross section of the member included in the protective fence 91b. The cross sections in the virtual plane are arranged discretely in the direction along the lateral surface of the trolley 90. The contour of the outer shape of the lateral surface of the trolley 90 based on the outer shape of the protective fence 91b at the scanned height is divided. The trolley 90 can load the luggage (target object) inside the protective fence

91b. The unmanned carriage vehicle 100 loads the luggage in an observable state by the sensor device 30.

The two-dot chain line in the planar view shown in FIG. 7B shows the outer shape of the trolley 90, and the dashed line shows the outer shape of the loading portion 91. The outer shape of the outer shape model is associated with either of the above-described outer shape of the trolley 90 or the outer shape of the loading portion 91. The white circles scattered inside the rectangle indicate the locations of the members included in the protection fence 91b, and the black circles indicate the point cloud corresponding to the points indicating the locations of the members detected by scanning. The cross section in the virtual plane is arranged discretely in the direction along the lateral surface of the trolley 90. The above-described point cloud is arranged discretely in the direction along the outer shape of the outer shape model. As described above, if the trolley 90 is not loaded with the luggage, the point cloud marked with a black circle as shown in the plan view shown in FIG. 7B is detected.

Figure 8:
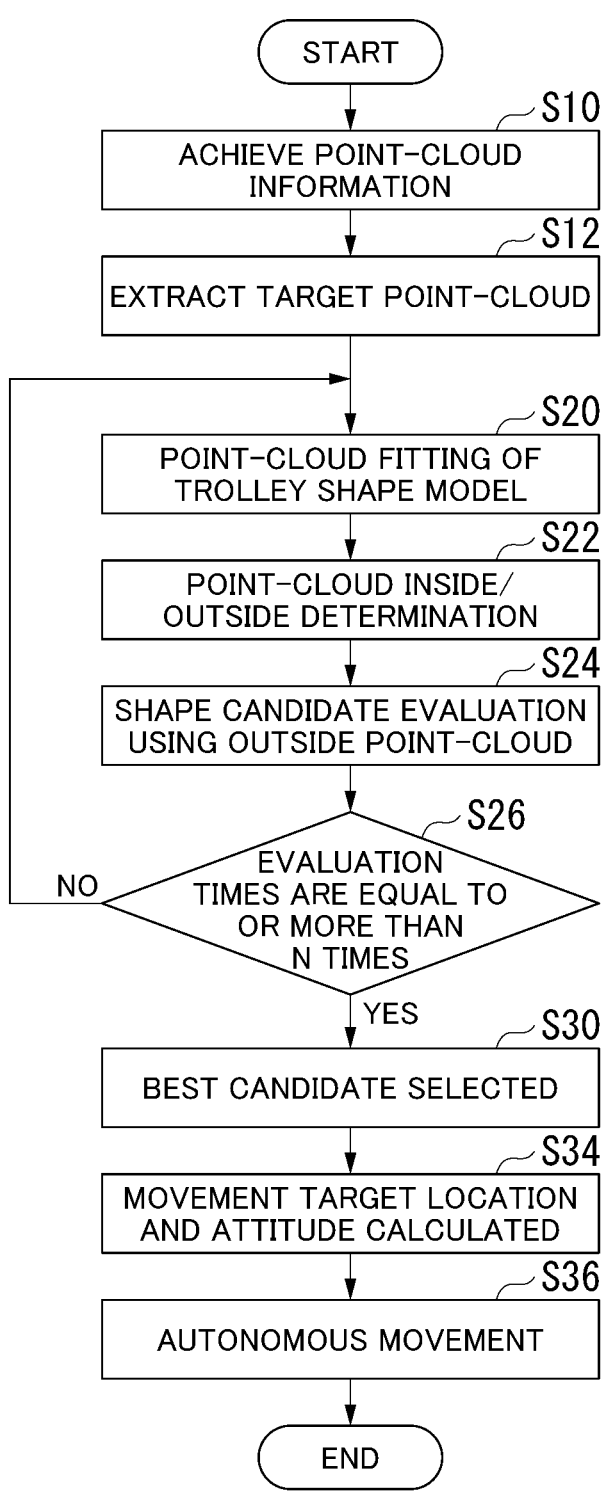
FIG. 8 is a flowchart showing a detection processing according to the first embodiment.

FIG. 8 is a flowchart showing the detection processing according to the embodiment.

The processing shown in FIG. 8 starts from a state in which firstly, the unmanned carriage vehicle 100 has been moved to a starting location of the unloading luggage operations.

The sensor control portion 130 starts the scanning by the sensor device 30. The sensor control portion 130 acquires the point-cloud information from the sensor device 30 based on the detection result of the sensor device 30 (Step S10), and supplies the point-cloud information to the pint-cloud extraction portion 301. The point-cloud information extraction portion 301 acquires the information of the extraction target region DZN from the extraction target region reference table 401 and extracts the point cloud existing in the extraction target region DZN (Step S12).

The point cloud extracted by the point-cloud information extraction portion 301 is input to the trolley location-attitude estimation portion 302. The trolley location-attitude estimation portion 302 refers to the trolley shape model data 402 to perform fitting of the extracted point cloud and the model data (Step S30) to calculate as the outer shape candidate.

As described above, it is possible to perform the fitting with respect to the distribution of the point cloud on the cross section obtained by cutting out the trolley 90 at the height of the observation plane (the above-described virtual plane) of the sensor device 30 by using a monotonous figure to approximate the distribution of the point cloud to the monotonous figure. The rectangle is an example of the monotonous figure.

With regard to the processing relating to the fitting, for example, three or four points are randomly selected from the extracted point cloud and two line segments connecting those points are calculated. The two line segments whose angle formed by the two line segments match the angle based on the external model within an allowable range may be identified as outer shape candidates. Also, a number of the point clouds existing within a predetermined distance from each line segment may be used as a condition for the identification. Accordingly, a combination of the line segments whose number of the point clouds existing in the above-described range does not meet the predetermined standard may be excluded from the outer shape candidates. Furthermore, it is possible to weight the extracted point clouds and then exclude the point cloud that does not fulfil the certain weight from the selection target of the line segment calculation.

The trolley location-attitude estimation portion 302 evaluates the validity of the fitting result by the above-described processing. The trolley location-attitude estimation portion 302, for example, determines whether the extracted point cloud exists inside or outside the outer shape indicated by the fitted outer shape model (Step S22). The trolley location-attitude estimation portion 302 performs the evaluation only using the outer point cloud by excluding the inner point cloud whose observation result changes depending on the load status of the luggage on the trolley 90 (Step S24).

The trolley location-attitude estimation portion 302 repeats the fitting process from Step S20 and the processing related to the evaluation of the fitting process until the number of evaluations reaches a predetermined number (N times) or more. When the number of evaluations is equal to or more than N times, the trolley location-attitude estimation portion 302 selects the outer shape with the best evaluation value as the location-attitude of the trolley 90 based on the outer shape candidate group acquired from the above-described evaluation results (Step S30). As an index for the evaluation, it is possible to determine that the location-attitude of the trolley 90 with a smaller number of the point clouds at the outside takes a better evaluation value.

The trolley location-attitude estimation portion 302 supplies the location-attitude estimation result of the trolley 90 acquired by the above-described evaluation to the movement target calculation portion 303. The movement target calculation portion 303 specifies a location where the trolleys 90 are aligned and deployed from the relative movement location reference table 403, acquires a relative location for moving to the location, and calculates a movement target from the current location of unmanned carriage vehicle 100 (Step S34). The movement target calculation portion 303 supplies the calculated movement target to the movement-object-control portion 110. The movement-object-control portion 110 autonomously moves the unmanned carriage vehicle 100 to the target location (Step S36).

According to the above-described processing, the unmanned carriage vehicle is able to move to the target location.

Figure 9:
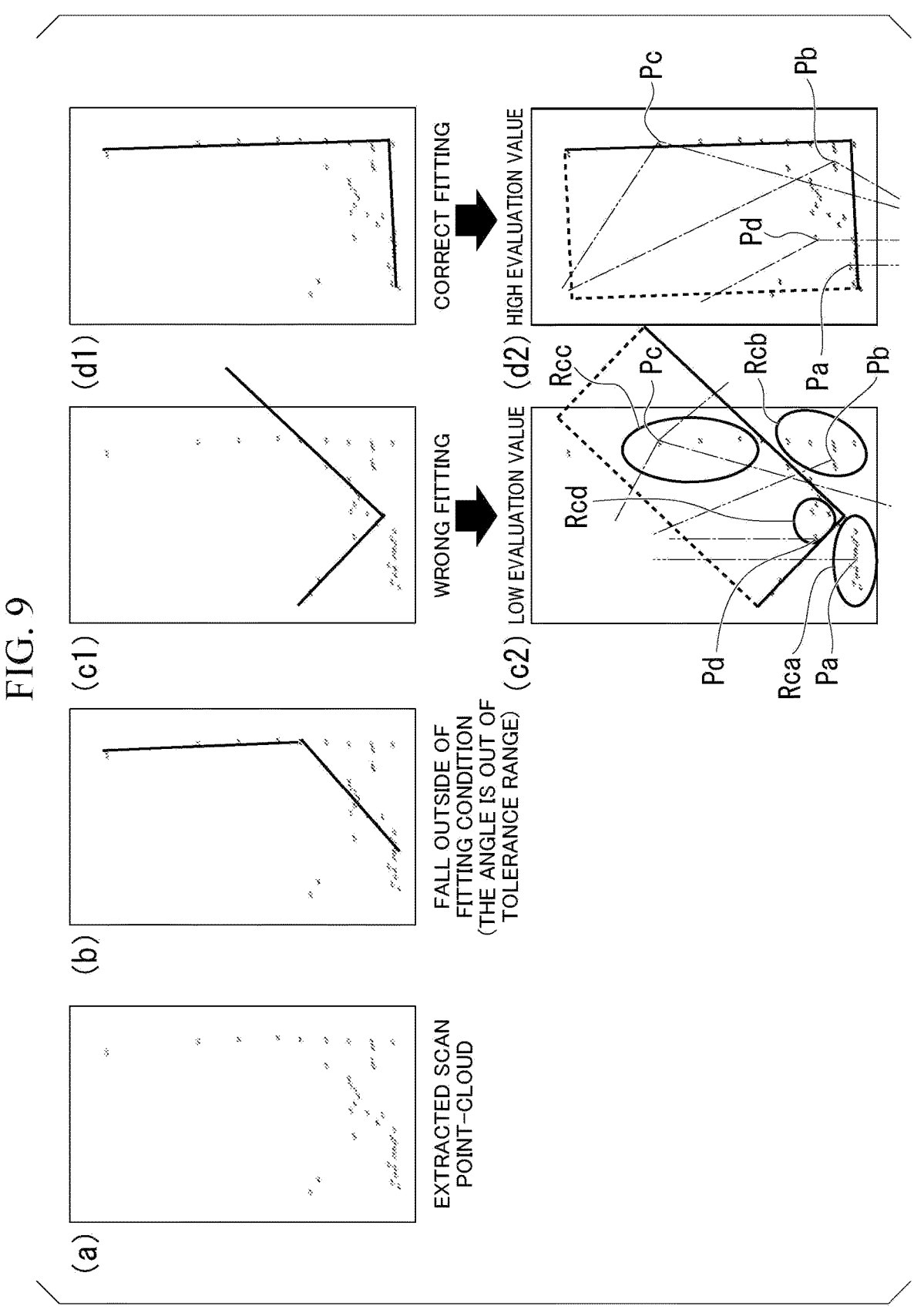
FIG. 9 is a view for describing a fitting algorithm according to the first embodiment.

Here, a further specific example of the fitting algorithm according to the embodiment will be described referring to FIG. 9. FIG. 9 is a view describing the fitting algorithm according to the embodiment.

In the part (a) of FIG. 9, the point group extracted in a predetermined range is shown. The frame in the part (a) of FIG. 9 shows the predetermined range. In the parts (b), (c1), and (c2) of FIG. 9, the unsuitable fitting examples as results of the process of fitting the outer shape model with respect to the point cloud shown in the part (a) of FIG. 9 are shown. In the parts (d1) and (d2) of FIG. 9, the suitable fitting examples as results of the process of fitting the outer shape model with respect to the point cloud shown in the part (a) of FIG. 9 are shown.

It is possible to reduce the load of the calculation process by the trolley location-attitude estimation portion 302 performing the process of fitting the outer shape model in two stages.

For example, a case where the outer shape of the trolley 90 is approximated to a rectangle will be described. In this case, among the four sides forming the outline, the line segments corresponding to the two adjacent sides may be used for the fitting process. When the approximated rectangle is a square, the two line segments have the characteristic of being orthogonal to each other.

Accordingly, at first, as shown in the part (b) of FIG. 9, the trolley location-attitude estimation portion 302 extracts a group of two line segments fitted to the point cloud.

For example, the trolley location-attitude estimation portion 302 generates a line segment representing the plurality of points by an analysis method using the positional information of the plurality of points. As the analysis method, the least squares method or the like may be applied; however, it is preferable to apply a robust estimation method such as the RANSAC (Random Sample Consensus) which can be applied even when a point deviating from the line segment exists. For example, according to the RANSAC, it is possible to extract a line segment in which the number of points existing in a predetermined width determined based on a line segment connecting two randomly extracted points is larger than a specified value.

The trolley location-attitude estimation portion 302 identifies the set in which the angle formed by the two line segments is within a predetermined range as a suitable set, and the set in which the angle is out of the predetermined range as an unsuitable set. It is preferable to set the predetermined range according to the angle formed by the two line segments so as to be able to extract the set of the line segments that are substantially orthogonal to each other. The result shown in the part (b) of FIG. 9 is an example in which the angle formed by the two line segments is out of the predetermined range. By the processing, the trolley location-attitude estimation portion 302 can extract the set in which the angle formed by the two line segments is within the predetermined range. By the above-described processing, for example, the fitting results as shown in the parts (c1) and (d1) of FIG. 9 are extracted. The rectangles shown in the parts (c1) and (d1) of FIG. 9 are examples of the outlines of the outer shape model based on the fitting results.

Next, when the four line segments indicated by the above-described fitting results are regarded as the outer lines of the outer shape model, the trolley location-attitude estimation portion 302 uses the point-cloud information corresponding to the points outside thereof to determine the validity of the pair of two line segments.

For example, it is possible to define a point cloud outside the outline of the outer shape model as follows. When the target point of the inside-outside judgement is regarded as a starting point and a half straight line connecting any point of the evaluation target from the starting point is generated, the points where the number of intersections between the line segment group forming the outline of the outer shape model and each of the above-described half straight lines is an odd number may be defined as inside points of the outer shape shown by the outer shape model, and the points where the number of intersections between the line segment group forming the outline of the outer shape model and each of the above-described half straight lines is an even number may be defined as outside points of the outer shape shown by the outer shape model. It should be noted that the points on the line segment group configuring the outer shape model and the points in a certain vicinity region thereof in consideration of the distance measurement error of the sensor device 30 may be regarded as the inner points.

For example, since the half straight lines shown in the two-dot chain line that are drawn from an arbitrary point within the range of Rca and Rcb in the part (c2) of FIG. 9 intersect the line segment group configuring the outer shape model twice, according to the above-described definition, it is identified as a point cloud outside the outer shape model in the part (c2) of FIG. 9. Since the half straight lines shown in the one-dot chain line that are drawn from an arbitrary point within the range of Rcc and Rcd intersect the line segment group configuring the outer shape model one, it is identified as a point cloud inside the outer shape model in the part (c2) of FIG. 9. More specifically, the point Pa and the point Pb are identified as the points outside the outer shape of the outer shape model, and the point Pc and the point Pd are identified as the points inside the outer shape of the outer shape model.

On the other hand, if the outer shape model is identified as shown in the part (d2) of FIG. 9, the point Pa, the point Pb, and the point Pd are identified as the points inside the outer shape of the outer shape model, and the point Pc is identified as the point outside the outer shape of the outer shape model. In this manner, the identification result of each point cloud differs depending on the identification status of the outer shape model.

Here, the fact that each point or point cloud exists outside or inside the outer shape of the outer shape model means that as shown in the part (c2) and (d2) of FIG. 9, there is an outer shape model formed by four sides (two solid lines and two dotted lines) and each point or each point cloud exist inside or outside of the area surrounded by the four sides. The outer side or inner side with respect to the outer shape of the outer shape model may be referred to as the outside or the inside of the outer shape model.

The trolley location-attitude estimation portion 302 estimates the location and attitude of the trolley 90 as the detection target object by estimating the location and attitude of the outer shape model such that the points at the outside of the outer shape model that is estimated as the configuration indicating the location and attitude of the trolley 90 become less based on the point-cloud information of the points shown in the part (a) of FIG. 9. At this time, it is preferable for the trolley location-attitude estimation portion 302 to use the point-cloud information of the point cloud existing at the outside of the outer shape of the outer shape model whose location and attitude are estimated to evaluate the estimation result of the location and attitude of the outer shape model and adjust the location and attitude of the outer shape model.

For this evaluation, information on the number of points that are determined to be outside may be used. For example, if the number of points determined to be outside is within the predetermined range, it may be determined that the fitting result is appropriate. Furthermore, with regard to the number of points, the smallest number of points determined to be outside may be selected as the most suitable one. According to this evaluation standard, even if there is a point greatly deviated from the line segment, it is possible to reduce the influence thereof.

Instead of the above-described evaluation standard, the following standard may be used for the evaluation.

For example, in the above-described evaluation, a distance between the point determined to be outside and the line segment corresponding to the outer shape may be used. If the total distance between the point determined to be outside and the line segment corresponding to the outer shape is within the predetermined range, it may be determined that the fitting result is appropriate. Furthermore, with regard to the total distance, the one having the smallest total distance between the points determined to be outside and the line segment corresponding to the outer shape may be selected as the most suitable one. According to this evaluation standard, it is possible to quantitatively evaluate the magnitude of the deviation of the fitting result.

The validity of the fitting result can be identified by evaluating according to any of the above evaluation standard. For example, the evaluation values of the fittings shown in the parts (c1) and (c2) of FIG. 9 show unsuitable values, and the evaluation values of the fittings shown in the parts (d1) and (d2) of FIG. 9 show suitable values.

Furthermore, it is preferable for the trolley location-attitude estimation portion 302 to adjust the arrangement of the outer shape model of the trolley 90 as the detection target object based on the evaluation result using the point cloud information such that the points determined to be outside the outer shape model whose location and attitude are estimated become less, estimate the location and the attitude of the detection target object accordingly, and adjust the movement target location according to the result.

Figures 10, 11:
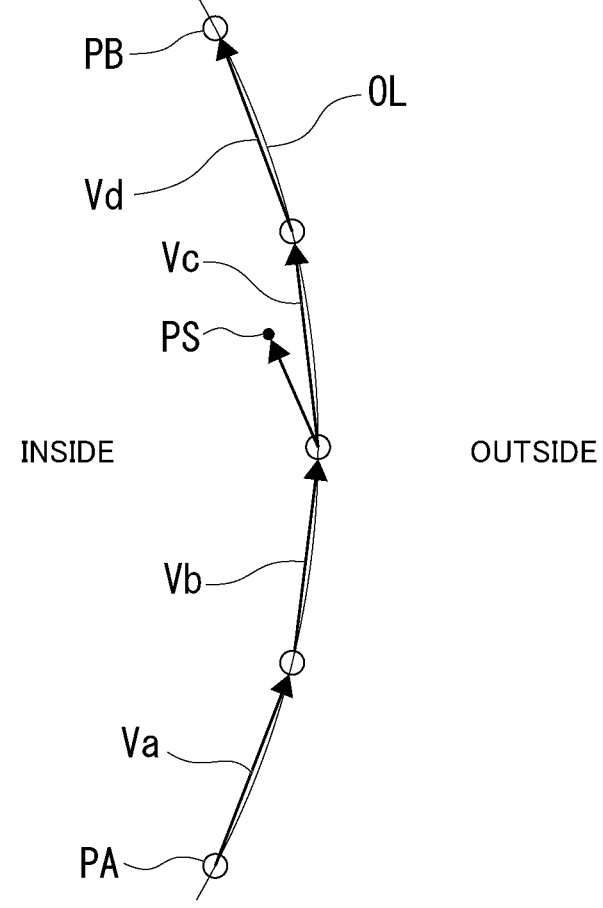
FIG. 10 is a view for describing a management of a storage status of the carriages according to the first embodiment.
FIG. 11 is a view for describing an application to a curved shape line according to a modification example.

Next, several usage configurations using the unmanned carriage vehicle 100 will be described by referring to FIG. 10. FIG. 10 is a view for explaining the management of the storage state of the trolley 90 according to the embodiment. FIG. 10 shows an example of the relative movement location reference table 403 according to the embodiment. The relative movement location reference table 403 includes items such as an identification number (No), a location, an attitude, and a trolley type. The identification number includes information for identifying each possible storage location for arranging the trolley 90. The location indicates each storage place for storing the trolley 90. The attitude indicates the direction in which the trolley 90 is arranged in the storage place. For example, an index of an angle when the trolley 90 is arranged in a state of being rotated around a vertical direction with respect to a reference direction is stored in the attitude. The index of the angle may be expressed by an angle (for example, +5 degrees) when 0 degree is used as a reference direction. The trolley type indicates the type of the trolley 90.

Firstly, an applicable case for the purpose of deploying the trolley 90B at the transport destination will be described.

The movement target calculation portion 303 refers to the relative movement location reference table 403 to specify a location where the trolley 90B designated by a host device can be deployed, and determines the movement target of the unmanned carriage vehicle 100 corresponding to this location. The movement target calculation portion 303 supplies information indicating the location (designated location information) to the movement-object-control portion 110. The movement control portion 112 transports and deploys the trolley 90B by the unmanned carriage vehicle 100 to a predetermined location corresponding to the designated location information based on the designated location information acquired from the movement target calculation portion 303.

For example, in the relative movement location reference table 403, the trolley 90 is not deployed in the storage place ZB at the location designated by No. (K). In a case in which "No. (K)" is designated by the designated location information, the movement control portion 112 moves the trolley 90B to the location of the storage place ZB by the unmanned carriage vehicle 100, and then releases the coupling between the unmanned carriage vehicle 100 and the trolley 90B by the attachment-detachment control portion 120.

Next, an applicable case of the transportation of the stored trolley 90 will be described.

The movement target calculation portion 303 specifies the location of the trolley 90 designated by the host device with reference to the relative movement location reference table 403, and determines the movement target of the unmanned carriage vehicle 100 in corresponding to this location. The movement target calculation portion 303 supplies information indicating the location (designated location information) to the movement-object-control portion 110. The movement control portion 112 controls the unmanned carriage vehicle 100 to approach the trolley 90, that is stored at the designated location corresponding to the designated location information, based on the designated location information acquired from the movement target calculation portion 303.

For example, in the relative movement location reference table 403, the trolley 90A is deployed at the storage place ZA at the location designated by No. (K-1). In a case in which "No. (K-1)" is designated by the designated location information, the movement control portion 112 controls the unmanned carriage vehicle 100 to approach the trolley 90A stored in the storage place ZA.

Thereafter, the movement control portion 112 moves the unmanned carriage vehicle 100 to the predetermined location, and then the unmanned carriage vehicle 100 is coupled to the trolley 90A by the attachment-detachment control portion 120. The coupled body 100P is transported from the host device to the designated location.

Next, an applicable case for the purpose of detection the storage state of the trolley 90 again will be described.

When the execution of detecting the storage state again is designated by the host device, the movement target calculation portion 303 refers to the relative movement location reference table 403 to determine the location capable of detecting the storage state of the trolley 90, supplies information indicating the location (designated location information) to the movement-object-control portion 110, and instructs to detect the storage state again. The movement control portion 112 controls the unmanned carriage vehicle 100 to move to the designated location corresponding to the designated location information based on the designated location information acquired from the movement target calculation portion 303. At this time, it is assumed that there is a region where the trolley 90 is deployed in the direction +X of the unmanned carriage vehicle 100.

Thereafter, the movement control portion 112 moves the unmanned carriage vehicle 100 in the direction Y according to the instruction for detecting the storage state again. The movement-object-control portion 110 and the data processing portion 300 cooperate with each other to acquire the state regarding the current location and attitude of the trolley 90 at each storage location, and to write this detection result in the relative movement location reference table 403 to and update the data therein. Due to such a process of detecting the storage state again, in a case in which inconsistency occurs between the location and attitude of the trolley 90 at each storage place and the data of the relative movement location reference table 403 due to some reason, it is possible to resolve this inconsistent state.

According to the above-described embodiment, the data processing portion 300 of the unmanned carriage vehicle 100 includes a point-cloud information extraction portion 301, a trolley location-attitude estimation portion 302, and a movement target calculation portion 303. The point-cloud information extraction portion 301 scans the light by the sensor device 30 to acquire point-cloud information corresponding to a plurality of locations of the trolley 90 (detection target object). The trolley location-attitude estimation portion 302 uses the consistency with the outer shape model of the trolley 90 as an evaluation index to estimate the location-attitude of the detection target object based on the above-described point-cloud information. The movement target calculation portion 303 outputs information regarding the movement target location based on the estimation result. The trolley location-attitude estimation portion 302 fits the outer shape model showing the outer shape of the trolley 90 into a point cloud of the point-cloud information, and estimates the location and attitude of the trolley 90 using the point-cloud information existing outside the outer shape model. Accordingly, the detection system 1 can identify the location and attitude of the transportation target object. The data processing portion 300 may configure the detection system 1.

The outer shape of most of the trolleys 90 is made of a pipe frame and a resin mesh. Therefore, due to the observation using the optical sensor such as a laser range finder (LRF), the load or the like inside the trolley 90 is detected. In this case, the observation result changes depending on the presence or absence of the load and the load capacity; however, according to the present embodiment, it is possible to identify the location-attitude of the trolley 90.

First Modification Example of First Embodiment

A first modification example of the first embodiment will be described.

In the first embodiment, the example in which the extraction target regions DZF and DZN (see FIG. 6A and FIG. 6B) are designated as relative locations with respect to the unmanned carriage vehicle 100 has been described. In the present modification example, instead, an example in which the extraction target region DZF is designated as the relative location with respect to the surrounding environment of the unmanned carriage vehicle 100 will be described.

For the extraction target regions DZF and DZN, the location and range in which the trolley 90 is deployed may be specified in advance with respect to the surrounding environment around the unmanned carriage vehicle 100. The surrounding environment around the unmanned carriage vehicle 100 relates to a situation of the movement range for driving the unmanned carriage vehicle 100 to transport the trolley 90. More specifically, within or in the vicinity of the movement range, a configuration capable of relatively specifying the location of the unmanned carriage vehicle 100 or a configuration capable of relatively specifying the range possible for the unmanned carriage vehicle 100 to travel is deployed. As a result, the unmanned carriage vehicle 100 can analytically specify the relative location with respect to the surrounding environment or calculate the relative location with respect to the surrounding environment by recognizing markers deployed in the environment. By combining this calculation result with the specified value of the extraction target region reference table 401, the extraction target region for the unmanned carriage vehicle 100 can be obtained. As a self-location estimation method for relatively specifying the location of the unmanned carriage vehicle 100, for example, the SLAM (Simultaneous Localization and Mapping) is known.

According to the above-described present modification example, even when the extraction target region DZF is designated as the relative location with respect to the surrounding environment of the unmanned carriage vehicle 100, the same effect as that of the present embodiment is obtained.

Second Modification Example of First Embodiment

A second modification example of the first embodiment will be described referring to FIG. 11.

In the first embodiment, the example of a rectangular outer shape model has been described. In this modification example, an example of the outer shape model having a shape that is difficult to approximate to a monotonous outer shape will be described.

FIG. 11 is a view for explaining the application of the present modification example to a curved outer shape line.

As shown in FIG. 11, there is a case in which the outer shape line OL from the point PA to the point PB may be curved to form a convex shape on the outline of the outer shape model. In such a case, it is preferable to approximate the outer shape line OL by a polygonal line, and regard the constituent line segment group of the approximation result of the outer shape line OL as a combination of the vectors Va, Vb, Vc, and Vd in the counterclockwise direction. Furthermore, it is preferable to identify whether the location of the point PS of the evaluation target is inside or outside the outer shape line OL by the following method. The point PS of the evaluation target and the above-described vector Vc as a first vector are selected, and a second vector in which the point PS of the evaluation target and viewed from the start point of the vector Vc is defined. An outer product of the first vector and the second vector is calculated. It is possible to regard the point PS of the evaluation target as a point inside the outer shape line OL if the point where the outer product of the first vector being selected from the vectors Va, Vb, Vc, and Vd in this sequence and the second vector is always a positive value.

In the calculation of the evaluation value, for example, the number of the point cloud existing on the outside can be used as the evaluation value, or the total value of the distances from each of the points on the outside to the outer shape can be used as the evaluation value. According to the former method, there is a feature that the influence of large outliers may be reduced, and according to the latter method, there is a feature that it is easier to quantitatively evaluate the magnitude of the fitting deviation. Furthermore, in the calculation of the evaluation value, it is possible to use the product obtained by multiplying the weights.

Second Embodiment

Figure 12:
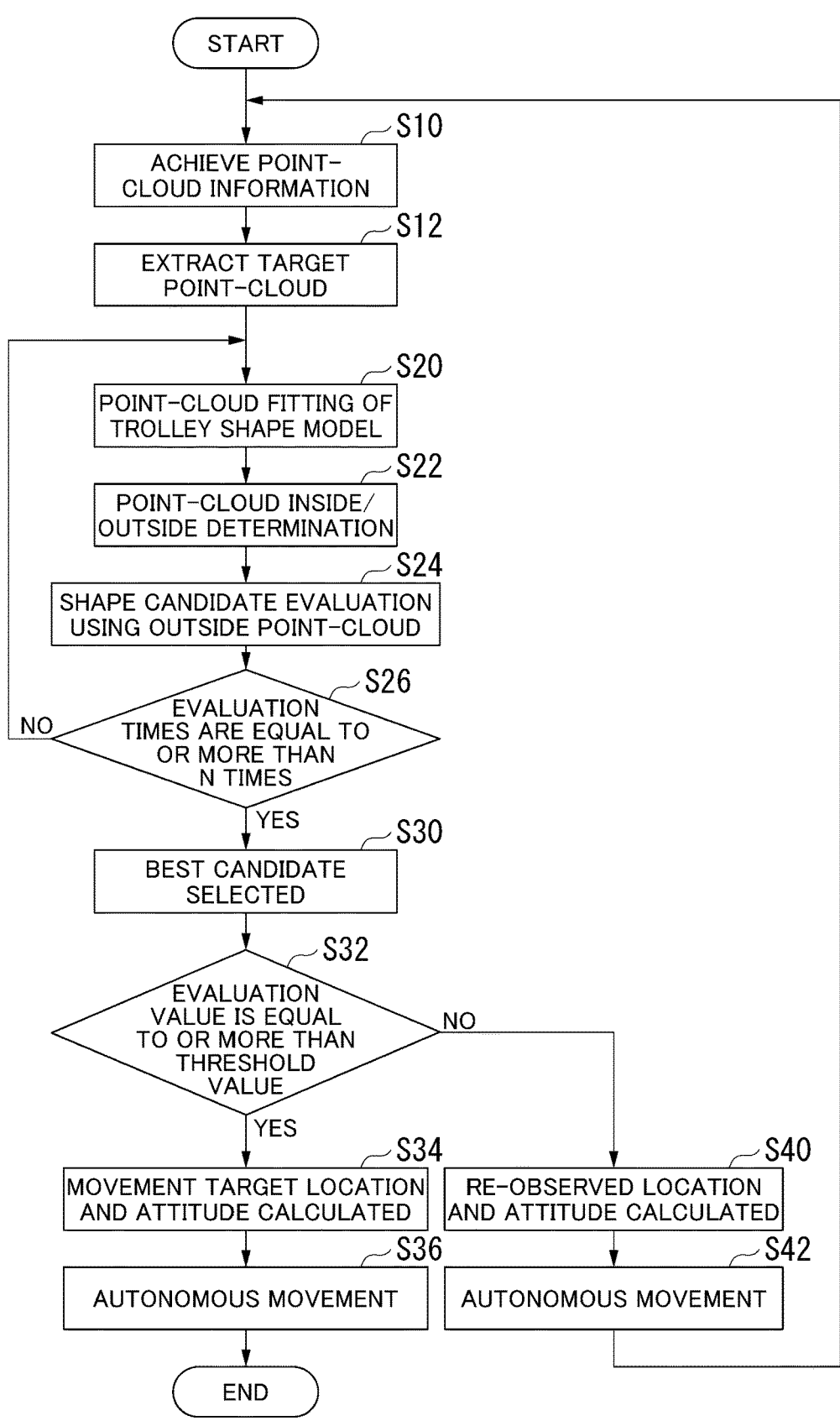
FIG. 12 is a flowchart showing a detection processing according to a second embodiment.

A second embodiment will be described referring to FIG. 12. According to the second embodiment, a case where a solution is taken to solve a problem when a valid estimation result is not obtained by the fitting process according to the first embodiment will be described. FIG. 12 is a flowchart showing the flow of the detection process according to the second embodiment.

Mainly, the sensor control portion 130 and the data processing portion 300 perform the fitting process in the same procedure as the procedure from Step S10 to Step S30 shown in FIG. 8 described above.

The trolley location-attitude estimation portion 302 determines whether or not the value of the evaluation result in Step S24 is equal to or higher than a predetermined threshold value with respect to the outer shape selected as the best candidate during the process of Step S30 (Step S32). In a case in which the evaluation result regarding the best candidate satisfies the threshold value specified in advance, the trolley location-attitude estimation portion 302 performs the process of Step S34.

On the other hand, in a case in which as the result of the above determination, if the evaluation result regarding the best candidate does not satisfy the threshold value specified in advance, the trolley location-attitude estimation portion 302 determines that a suitable estimation result has not been obtained, and notifies the movement target calculation portion 303 with the determination result. The movement target calculation portion 303 refers to the relative movement location reference table 403 in which the location-attitude relative to the unmanned carriage vehicle 100 is defined, and to control the movement control portion 112 to move the location of the unmanned carriage vehicle 100 such that the location or attitude of the unmanned carriage vehicle 100 is different from that during the previous observation of the trolley 90. The sensor control portion 130 and the data processing portion 300 observe the location and attitude of the trolley 90 again from the location of the movement destination (Step S40), and calculate the movement target of the unmanned carriage vehicle 100. The data processing portion 300 notifies the movement control portion 112 with the movement target of the unmanned carriage vehicle 100. The movement control portion 112 autonomously moves the unmanned carriage vehicle 100 to the movement target calculated from the result of the re-observation (Step S42). In response to the process, the unmanned carriage vehicle 100 repeats the process from Step S10 so as to observe the trolley 90 as the transportation object again from the location and direction different from the previous observation, and to execute the estimation and evaluation again.

According to the present embodiment, it is possible for the unmanned carriage vehicle 100 to improve the detection accuracy of the trolley by the unmanned carriage vehicle 100 moving by itself.

Third Embodiment

Figure 13:
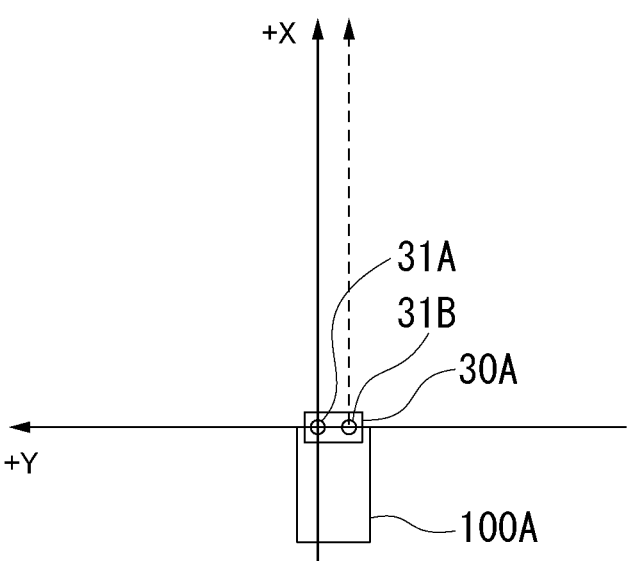
FIG. 13 is a view showing a configuration of an unmanned carriage vehicle according to a third embodiment.
Figure 14:
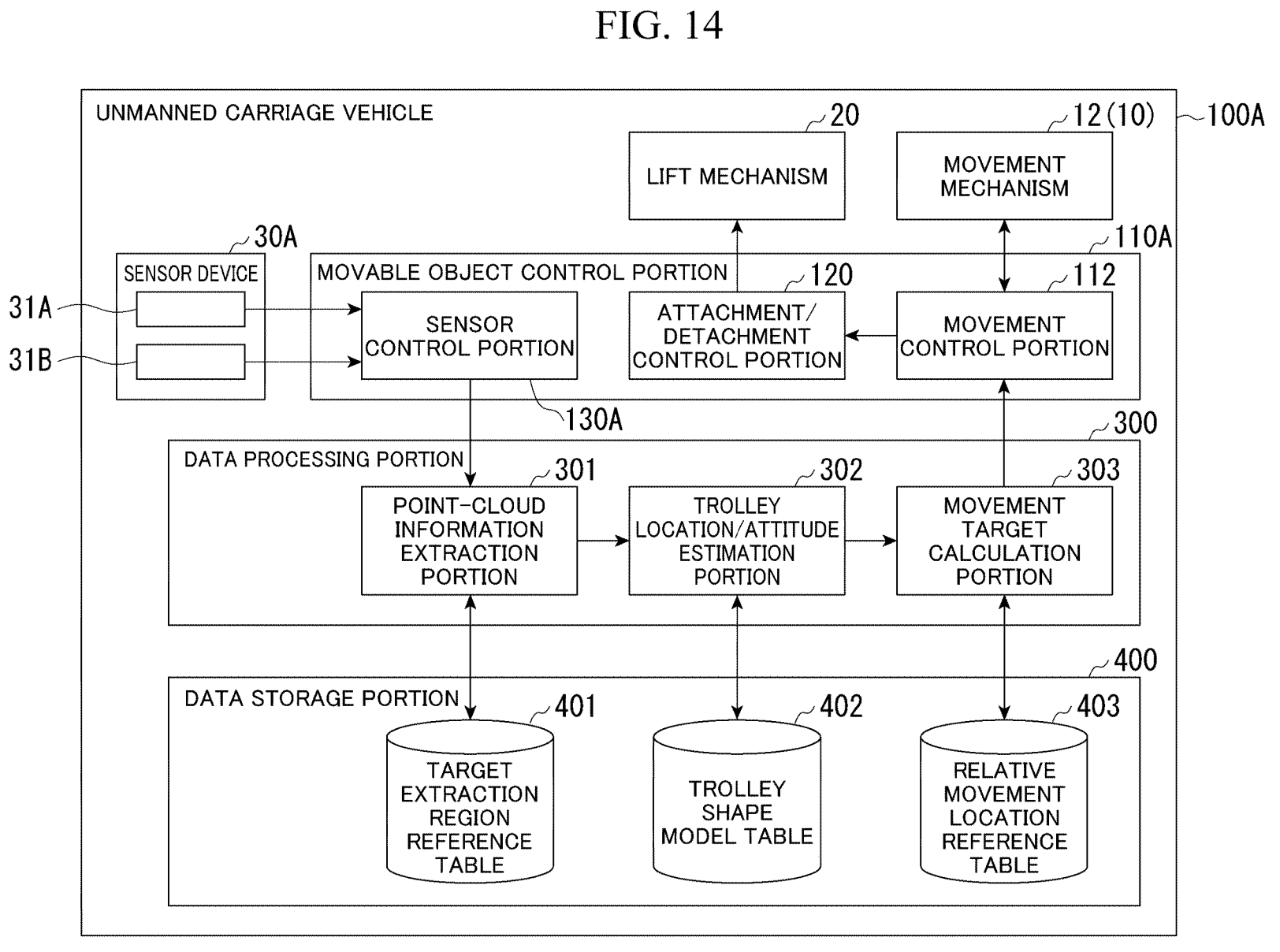

An unmanned carriage vehicle 100A corresponding to a detection system IA according to the third embodiment will be described referring to FIG. 13 and FIG. 14. FIG. 13 is a configurational view of the unmanned carriage vehicle 100A according to the third embodiment. FIG. 14 is a view for explaining an extraction target region according to the third embodiment. As shown in FIG. 14, the unmanned carriage vehicle 100A includes a sensor device 30A and a movement-object-control portion 110A instead of the sensor device 30 and the movement-object-control portion 110.

The sensor device 30A includes a sensor 31A and a sensor 31B instead of the sensor 31. The sensor 31A and the sensor 31B each have a configuration equivalent to that of the sensor 31. The sensor 31A and the sensor 31B are arranged at a predetermined distance in the direction Y in the unmanned carriage vehicle 100A.

The movement-object-control portion 110A includes a sensor control portion 130A instead of the sensor control portion 130. The sensor control portion 130A acquires the detection distance information generated by the sensor 31A and sensor 31B, respectively, and supplies the detection distance information to the data processing portion 300. The location information indicated by the point-cloud information acquired from the sensor 31A and sensor 31B is information being offset in the direction Y by a predetermined distance corresponding to the attachment interval of the sensor 31A and sensor 31B. It is preferable for the sensor control portion 130A to supply the point-cloud information compensated so as to cancel this offset to the data processing portion 300.

As described above, by disposing the sensor 31A and sensor 31B separately in the direction Y, for example, even in a case in which one of the protective fences 91b of the trolley 90 overlaps on the scanning optical axis of the sensor 31A, it does not overlap on the scanning optical axis of the sensor 31B. Therefore, it is possible for the sensor control portion 130A to detect one location of the protection fence 91*b* simply by switching the sensor to be used without moving the unmanned carriage vehicle 100.

Fourth Embodiment

A detection system 1B according to the fourth embodiment will be described referring to FIG. 15 and FIG. 16.

Figure 15:
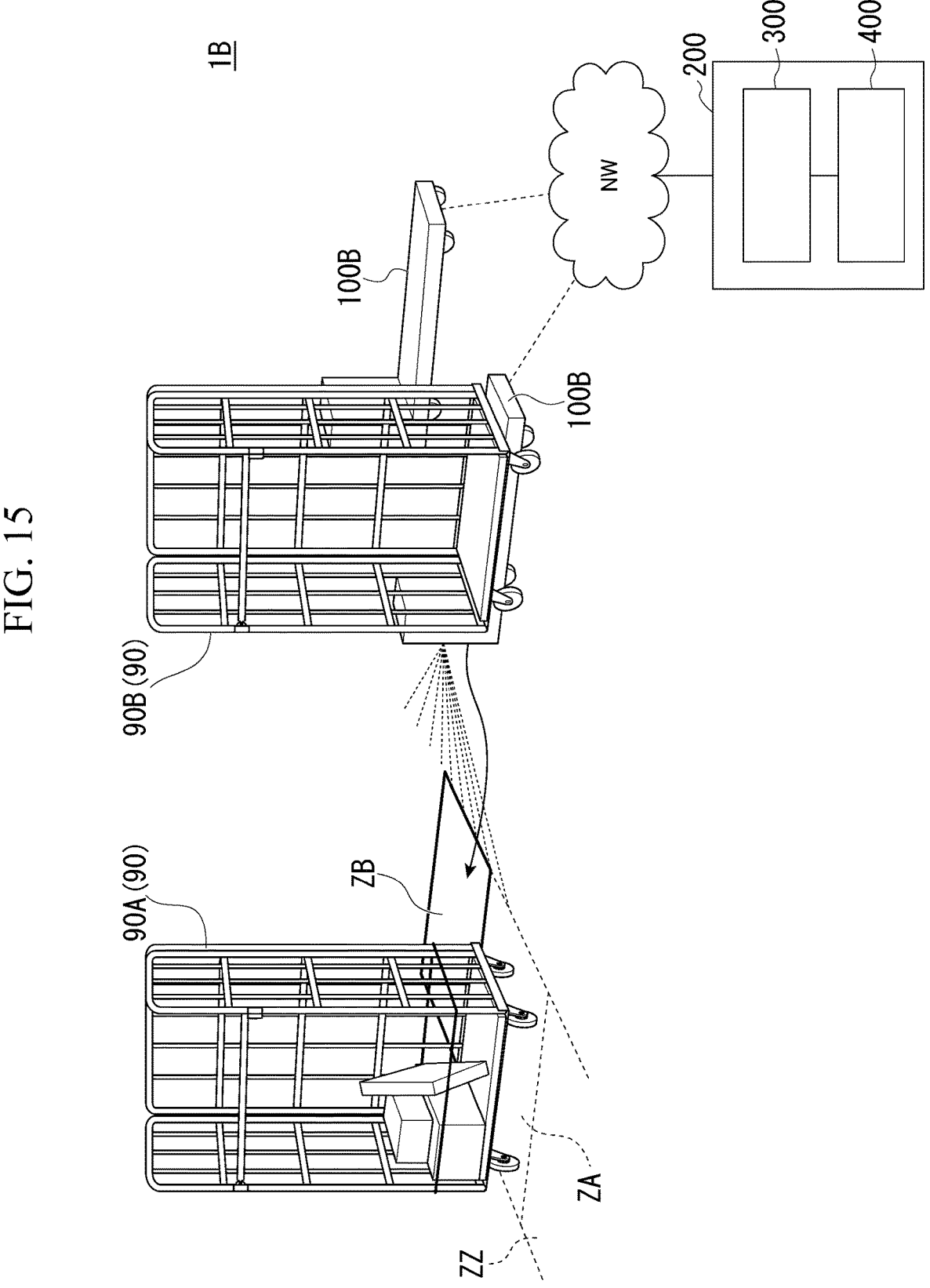
FIG. 15 is a schematic view showing an example of an applicable location of a detection system according to a fourth embodiment.

FIG. 15 is a schematic view showing an example of an applicable place of the detection system 1B according to the fourth embodiment. FIG. 16 is a configurational view of the detection system 1B according to the fourth embodiment.

The detection system 1B includes a processing apparatus 200. The processing apparatus 200 may be an example of the detection system 1B. For example, the detection system 1B shown in FIG. 15 includes an unmanned carriage vehicle 100B and the trolley 90A and trolley 90B as transportation target objects besides the processing apparatus 200.

The unmanned carriage vehicle 100B includes a movement-object-control portion 110B instead of the movement-object-control portion 110. The unmanned carriage vehicle 100B that is different from the above-described unmanned carriage vehicle 100 may not have to include the data processing portion 300 and the data storage portion 400.

Instead, the processing apparatus 200 includes a data processing portion 300 and a data storage portion 400. The data processing portion 300 and the data storage portion 400 in the processing apparatus 200 correspond to the data processing portion 300 and the data storage portion 400 of the unmanned carriage vehicle 100 described above.

The movement-object-control portion 110B of the unmanned carriage vehicle 100B includes a movement control portion 112B and a sensor control portion 130B instead of the movement control portion 112 and the sensor control portion 130. The movement control portion 112B and the sensor control portion 130B communicate with the data processing portion 300 of the processing apparatus 200 via a network NW.

The unmanned carriage vehicle 100 described above includes the data processing portion 300 and the data storage portion 400 such that the processing based on the detection result by the sensor device 30 is processed internally. The unmanned carriage vehicle 100B according to the present embodiment can cooperate with the processing apparatus 200 by communicating with the processing apparatus 200 via the network NW. In this state, the unmanned carriage vehicle 100B may realize the same control as that of the unmanned carriage vehicle 100.

Figure 17:
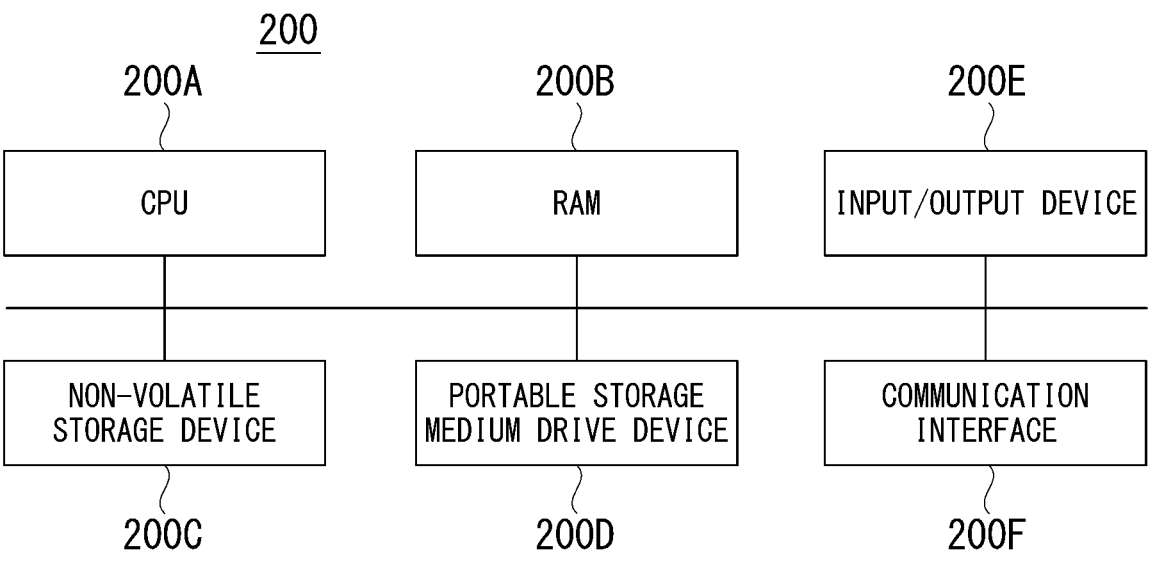
FIG. 17 is a view showing an example of a hardware configuration of the processing apparatus according to the embodiments.

FIG. 17 is a view showing a hardware configuration example of the processing apparatus 200 according to the present embodiment. The processing apparatus 200 includes, for example, a CPU 200A, a RAM (Random Access Memory) 200B, a non-volatile storage device (non-transitory computer-readable storage medium) 200C, a portable storage medium drive device 200D, an input-output device 200E, and a communication interface 200F. The processing apparatus 200 may include an arbitrary processor such as a GPU or the like instead of the CPU 200A. Furthermore, part of the configuration elements shown in FIG. 17 may be omitted.

The CPU 200A is configured to perform the various processes described below by extracting the program that is stored in the non-volatile storage device 200C or the program stored in the portable storage medium mounted on the portable storage medium drive device 200D to the RAM 200B and executing the program therein. The RAM 200B is used as a working area by the CPU 200A. The non-volatile storage device 200C is, for example, an HDD, a flash memory, a ROM, or the like. A portable storage medium such as a DVD, a CD (Compact Disc), or an SD (registered trademark) card and the like is mounted on the portable storage medium drive device 200D. The input-output device 200E includes, for example, a keyboard, a mouse, a touch panel, a display device, and the like. The communication interface 200F functions as an interface when the processing apparatus 200 communicates with other devices such as the unmanned carriage vehicle 100B.

With regard to each functional portion (for example, the data processing portion 300) of the processing apparatus 200, for example, at least a part thereof is realized by a hardware processor such as the CPU 200A or the GPU executing the program (software) that is stored in the non-volatile storage device 200C or the like. Further, a part or all of the functional portions of the processing apparatus 200 may be realized by the hardware (circuit portion; circuitry) such as an LSI, an ASIC, an FPGA, or realized by the cooperation of software and hardware. The processing apparatus 200 is an example of a computer.

According to the above-described embodiment, the processing apparatus 200 includes a point-cloud information extraction portion 301, a trolley location-attitude estimation portion 302, and a movement target calculation portion 303. According to the processing apparatus 200 the same effect as that of the first embodiment may be achieved by the processing apparatus 200 communicating with the unmanned carriage vehicle 100B via the communication interface 200F.

According to at least one embodiment described above, the detection system includes an acquisition portion, an estimation portion, and an output portion. The acquisition portion scans the light to acquire point-cloud information corresponding to a plurality of positions of the detection target object. The estimation portion estimates the location and attitude of the detection target object based on the point-cloud information by using the consistency with the outer shape model of the detection target object as an evaluation index. The output portion outputs information regarding the movement target position based on the estimation result. It is possible for the estimation portion to identify the location and attitude of the transportation target object by a simpler process of fitting an outer shape model showing the outer shape of the detection target object to the point cloud according to the point-cloud information, and using the point-cloud information existing outside the outer shape model to estimate the location and attitude of the detection target object.

Although some embodiments of the present invention have been described, these embodiments are presented as examples and are not intended to limit the scope of the invention. These embodiments can be implemented in various other embodiments, and various omissions, replacements, and changes can be made without departing from the scope of the invention. These embodiments and variations thereof are included in the scope of the invention described in the claims and the equivalent scope thereof, as are included in the scope and gist of the invention.

For example, it is preferable for the surface on which the unmanned carriage vehicle 100 and the trolley 90 move to be horizontal so that the trolley 90 does not start moving due to the inclination of the surface. The virtual plane scanned by the sensor device 30 is preferably parallel to the surface on which the unmanned carriage vehicle 100 and the trolley 90 move while securing a wider detection range. Furthermore, it is preferable that the virtual plane scanned by the sensor device 30 is horizontal as same as the surface on which the unmanned carriage vehicle 100 and the trolley 90 move. For example, in a case in which the above-described virtual plane and the surface on which the unmanned carriage vehicle 100 and the trolley 90 move are both horizontal and the shape of the trolley 90 is approximated to a rectangular shape, the cross section of the outer shape model in the virtual plane becomes rectangular. On the other hand, if the virtual plane and the surface on which the unmanned carriage vehicle 100 and the carriage 90 move are not parallel, the cross section of the outer shape model in the virtual plane will be distorted from the rectangular shape. In consideration of such a viewpoint, the virtual plane may be parallel to the surface on which the unmanned carriage vehicle 100 and the trolley 90 move. However, the configuration in which the virtual plane scanned by the sensor device 30 is provided to form an angle so as to be inclined with respect to the surface on which the unmanned carriage vehicle 100 and the carriage 90 move is not particularly limited.

The case in which the loading portion 91 of the trolley 90 is selected as the detection target according to the above embodiment and the height of the protection fence 91*b* is selected as the height of the virtual plane scanned by the sensor device 30 has been described. However, the configuration of selecting the height of the loading plate 91*a* is not limited. It is possible to appropriately perform the selection.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A detection system, comprising:
processing circuitry configured to:
acquire point-cloud information corresponding to a plurality of positions of a detection target object using a light scanning device;
estimate a location and an attitude of the detection target object based on the point-cloud information using consistency with an outer shape model of the detection target object; and
output information relating to a movement target location based on an estimation result,
wherein the processing circuitry configured to estimate fits an outer shape model indicating an outer shape of the detection target object to a point cloud according to the point-cloud information, and uses only point-cloud information existing outside the outer shape model to estimate the location and the attitude of the detection target object,
wherein the detection system identifies the outside of the outer shape model based on a number of intersections between a half straight line connecting points as targets of inside-outside determination of the detection target object and an arbitrary point of the detection target object and a line segment group forming an outline of the outer shape model.

2. A detection system, comprising:
processing circuitry configured to:
acquire point-cloud information corresponding to a plurality of positions of a detection target object using a light scanning device;

estimate a location and an attitude of the detection target object based on the point-cloud information using consistency with an outer shape model of the detection target object; and
output information relating to a movement target location based on an estimation result,
wherein the processing circuitry is configured to estimate fits an outer shape model indicating an outer shape of the detection target object to a point cloud according to the point-cloud information, and uses only point-cloud information existing outside the outer shape model to estimate the location and the attitude of the detection target object,
wherein the processing circuitry configured to estimate estimates the location and attitude by minimizing a distance between points, in the point cloud information outside of the outer shape model, and a line segment group forming an outline of the outer shape model.

3. The detection system according to claim 2, wherein the processing circuitry configured to estimate estimates the location and attitude of the detection target object by adjusting an arrangement of the outer shape model so as to make points determined to be at the outside of the outer shape model whose location and attitude are estimated based on the point-cloud information to become less.

4. The detection system according to claim 2, wherein the processing circuitry configured to estimate evaluates the estimation result of the location and attitude of the outer shape model by using the point cloud existing outside the outer shape of the outer shape model whose location and attitude are estimated.

5. The detection system according to claim 2,
wherein a lateral surface of the detection target object includes a member for reflecting the light, and
a cross section of the member receiving the light for scanning is discretely arranged in a direction along the lateral surface of the detection target object.

6. The detection system according to claim 5, wherein the point cloud corresponding to the location of the member reflecting the light is discretely arranged in a direction along the outer shape of the outer shape model.

7. The detection system according to claim 1, wherein the processing circuitry configured to estimate estimates the location and attitude by minimizing a distance between points, in the point cloud information outside of the outer shape model, and the line segment group forming an outline of the outer shape model.

8. A processing apparatus, comprising:
processing circuitry configured to:
acquire point-cloud information corresponding to a plurality of positions of a detection target object using a light scanning device;
estimate a location and an attitude of the detection target object based on the point-cloud information using consistency with an outer shape model of the detection target object; and
output information relating to a movement target location based on an estimation result,
wherein the processing circuitry configured to estimate fits an outer shape model indicating an outer shape of the detection target object to a point cloud according to the point-cloud information, and uses only point-cloud information existing outside the outer shape model to estimate the location and the attitude of the detection target object, and
wherein the processing circuitry configured to estimate estimates the location and attitude by minimizing a distance between points, in the point cloud information outside of the outer shape model, and a line segment group forming an outline of the outer shape model.

9. A movement object, comprising:

a detection system according to claim 1; and a movement mechanism driving the movement object based on an estimation result of the location and attitude of the detection target object.

10. The movement object according to claim 9, further includes a distance sensor generating the point-cloud information, wherein the estimation result in which the location and attitude of the detection target object is estimated is acquired by a detection result of the distance sensor.

11. The movement object according to claim 10, wherein the processing circuitry is further configured to:

extract point-cloud information referring to a table in which an extraction target region of the detection target object is defined to extract the point-cloud information in the extraction target region; and control the movement mechanism based on the information of the location and attitude of the detection target object, and wherein the processing circuitry configured to estimate estimates the location and attitude of the detection target object using the extracted point-cloud information as the point-cloud information.

12. The movement object according to claim 9, wherein an extraction target region of the detection target object is designated as a relative location with respect to a self-moving object or a relative location with respect to a surrounding environment of the self-moving object.

13. The movement object according to claim 12, wherein the detection target object is a transportation target coupled with the self-moving object and transported, and the processing circuitry configured to control determines a location where the self-moving object is coupled with the transportation target as a movement target of the self-moving object based on the estimation result of the detection target object and controls moving the self-moving object to the movement target of the self-moving object.

14. The movement object according to claim 13, wherein the processing circuitry configured to output refers to a table in which the location and attitude of the transportation target is defined to determine the movement object of the self-moving object in a case in which the transportation target is coupled with the self-moving object.

15. The movement object according to claim 13, wherein the processing circuitry configured to output refers to a table in which the location and attitude of the transportation target is defined to determine the movement object of a self-moving object in a case of arranging the transportation targets having the same shape to be aligned.

16. The movement object according to claim 11, further comprising a movement mechanism moving a location of the distance sensor, wherein the processing circuitry configured to control refers to the outer shape model to move the distance sensor to a location suitable for the detection of the detection target object.

17. The movement object according to claim 9, wherein the processing circuitry configured to estimate uses the point cloud existing outside the outer shape of the outer shape model whose location and attitude are estimated to evaluate the estimation result of the location and attitude of the outer shape model, the processing circuitry configured to output refers to a table in which a relative location and attitude with respect to a self-moving object is defined to drive the movement mechanism based on the information of the relative location and attitude that are defined in the table in a case in which an evaluation as the estimation result equal to or better than a predetermined threshold value is not achieved, and the processing circuitry configured to estimate estimates the location and attitude of the detection target object again based on a result of re-observing the same detection target object as a previous observation from a location and an attitude different from the location and attitude in the previous observation of the detection target object.

18. The movement object according to claim 9, wherein the detection target object is loaded such that a contour of the outer shape of the detection target object is divided at a height scanned by irradiating the light, a load can be loaded inside the lateral surface of the detection target object, and the load is in an observable state by a distance sensor provided at outside of the lateral surface of the detection target object.

19. A detection method performed by a computer of a detection system, comprising:

scanning light to acquire point-cloud information corresponding to a plurality of positions of a detection target object;

using consistency with an outer shape model of the detection target object to estimate a location and an attitude of the detection target object based on the point-cloud information;

outputting information relating to a movement target location based on an estimation result; and fitting an outer shape model indicating an outer shape of the detection target object to a point cloud according to the point-cloud information, and using only point-cloud information existing outside the outer shape model to estimate the location and the attitude of the detection target object, wherein using consistency to estimate the location and attitude comprises minimizing a distance between points, in the point cloud information outside of the outer shape model, and a line segment group forming an outline of the outer shape model.

20. The detection system according to claim 2, wherein the processing circuitry configured to estimate estimates the location and attitude of the outer shape model so as to make points determined to be outside the outer shape model whose location and attitude are estimated based on the point-cloud information to become less.

* * * * *